(12) United States Patent
Evangelidis et al.

(10) Patent No.: US 12,265,664 B2
(45) Date of Patent: Apr. 1, 2025

(54) SHARED AUGMENTED REALITY EYEWEAR DEVICE WITH HAND TRACKING ALIGNMENT

(71) Applicant: Snap Inc., Santa Monica, CA (US)

(72) Inventors: Georgios Evangelidis, Vienna (AT); Bernhard Jung, Perchtoldsdorf (AT); Ilteris Kaan Canberk, Marina Del Rey, CA (US); Daniel Wolf, Mödling (AT); Balázs Tóth, Budapest (HU); Márton Gergely Kajtár, Felsopakony (HU); Branislav Micusik, St.Andrae-Woerdern (AT)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/341,558

(22) Filed: Jun. 26, 2023

(65) Prior Publication Data
US 2024/0288946 A1    Aug. 29, 2024

(30) Foreign Application Priority Data

Feb. 28, 2023    (GR) .............................. 20230100168

(51) Int. Cl.
*G09G 5/00*    (2006.01)
*G06F 3/01*    (2006.01)
(Continued)

(52) U.S. Cl.
CPC .............. *G06F 3/017* (2013.01); *G06F 3/012* (2013.01); *G06T 7/248* (2017.01); *G06T 7/74* (2017.01);
(Continued)

(58) Field of Classification Search
CPC . G06F 3/017; G06F 3/012; G06T 7/74; G06T 7/248; G06T 2207/30196; G06T 2207/30204; G06T 2207/30241
(Continued)

(56) References Cited

U.S. PATENT DOCUMENTS 666,223 A    1/1901    Shedlock
4,581,634 A    4/1986    Williams
(Continued)

FOREIGN PATENT DOCUMENTS

CA    2887596 A1    7/2015
CN    103049761 B    8/2016
(Continued)

OTHER PUBLICATIONS

"A Whole New Story", Snap, Inc., [Online] Retrieved from the Internet: <URL: https://www.snap.com/en-US/news/>, (2017), 13 pgs.
(Continued)

*Primary Examiner* — Jennifer T Nguyen
(74) *Attorney, Agent, or Firm* — Schwegman Lundberg & Woessner, P.A.

(57) ABSTRACT

A method for aligning coordinate systems of user devices in an augmented reality system using somatic points of a user's hand as alignment markers. Images captured from multiple user devices are used to align the reference coordinate systems of the user devices to a common reference coordinate system. In some examples, user devices capture images of a hand of a user and use object recognition to identify somatic points as alignment markers. The somatic points of a user device are translated to a common reference coordinate system determined by another user device.

20 Claims, 14 Drawing Sheets

(51) Int. Cl.
*G06T 7/246* (2017.01)
*G06T 7/73* (2017.01)

(52) U.S. Cl.
CPC .............. *G06T 2207/30196* (2013.01); *G06T 2207/30204* (2013.01); *G06T 2207/30241* (2013.01)

(58) Field of Classification Search
USPC ........................................................ 345/156
See application file for complete search history.

(56) References Cited

U.S. PATENT DOCUMENTS

| | | |
|---|---|---|
| 4,975,690 A | 12/1990 | Torres |
| 5,072,412 A | 12/1991 | Henderson, Jr. et al. |
| 5,493,692 A | 2/1996 | Theimer et al. |
| 5,713,073 A | 1/1998 | Warsta |
| 5,754,939 A | 5/1998 | Herz et al. |
| 5,855,008 A | 12/1998 | Goldhaber et al. |
| 5,883,639 A | 3/1999 | Walton et al. |
| 5,999,932 A | 12/1999 | Paul |
| 6,012,098 A | 1/2000 | Bayeh et al. |
| 6,014,090 A | 1/2000 | Rosen et al. |
| 6,029,141 A | 2/2000 | Bezos et al. |
| 6,038,295 A | 3/2000 | Mattes |
| 6,049,711 A | 4/2000 | Yehezkel et al. |
| 6,154,764 A | 11/2000 | Nitta et al. |
| 6,167,435 A | 12/2000 | Druckenmiller et al. |
| 6,204,840 B1 | 3/2001 | Petelycky et al. |
| 6,205,432 B1 | 3/2001 | Gabbard et al. |
| 6,216,141 B1 | 4/2001 | Straub et al. |
| 6,285,381 B1 | 9/2001 | Sawano et al. |
| 6,285,987 B1 | 9/2001 | Roth et al. |
| 6,310,694 B1 | 10/2001 | Okimoto et al. |
| 6,317,789 B1 | 11/2001 | Rakavy et al. |
| 6,334,149 B1 | 12/2001 | Davis, Jr. et al. |
| 6,349,203 B1 | 2/2002 | Asaoka et al. |
| 6,353,170 B1 | 3/2002 | Eyzaguirre et al. |
| 6,446,004 B1 | 9/2002 | Cao et al. |
| 6,449,657 B2 | 9/2002 | Stanbach et al. |
| 6,456,852 B2 | 9/2002 | Bar et al. |
| 6,484,196 B1 | 11/2002 | Maurille |
| 6,487,601 B1 | 11/2002 | Hubacher et al. |
| 6,523,008 B1 | 2/2003 | Avrunin |
| 6,542,749 B2 | 4/2003 | Tanaka et al. |
| 6,549,768 B1 | 4/2003 | Fraccaroli |
| 6,618,593 B1 | 9/2003 | Drutman et al. |
| 6,622,174 B1 | 9/2003 | Ukita et al. |
| 6,631,463 B1 | 10/2003 | Floyd et al. |
| 6,636,247 B1 | 10/2003 | Hamzy et al. |
| 6,636,855 B2 | 10/2003 | Holloway et al. |
| 6,643,684 B1 | 11/2003 | Malkin et al. |
| 6,658,095 B1 | 12/2003 | Yoakum et al. |
| 6,665,531 B1 | 12/2003 | Soderbacka et al. |
| 6,668,173 B2 | 12/2003 | Greene |
| 6,684,238 B1 | 1/2004 | Dutta |
| 6,684,257 B1 | 1/2004 | Camut et al. |
| 6,698,020 B1 | 2/2004 | Zigmond et al. |
| 6,700,506 B1 | 3/2004 | Winkler |
| 6,720,860 B1 | 4/2004 | Narayanaswami |
| 6,724,403 B1 | 4/2004 | Santoro et al. |
| 6,757,713 B1 | 6/2004 | Ogilvie et al. |
| 6,832,222 B1 | 12/2004 | Zimowski |
| 6,834,195 B2 | 12/2004 | Brandenberg et al. |
| 6,836,792 B1 | 12/2004 | Chen |
| 6,898,626 B2 | 5/2005 | Ohashi |
| 6,959,324 B1 | 10/2005 | Kubik et al. |
| 6,970,088 B2 | 11/2005 | Kovach |
| 6,970,907 B1 | 11/2005 | Ullmann et al. |
| 6,980,909 B2 | 12/2005 | Root et al. |
| 6,981,040 B1 | 12/2005 | Konig et al. |
| 7,020,494 B2 | 3/2006 | Spriestersbach et al. |
| 7,027,124 B2 | 4/2006 | Foote et al. |
| 7,072,963 B2 | 7/2006 | Anderson et al. |
| 7,085,571 B2 | 8/2006 | Kalhan et al. |
| 7,110,744 B2 | 9/2006 | Freeny, Jr. |
| 7,124,164 B1 | 10/2006 | Chemtob |
| 7,149,893 B1 | 12/2006 | Leonard et al. |
| 7,173,651 B1 | 2/2007 | Knowles |
| 7,188,143 B2 | 3/2007 | Szeto |
| 7,203,380 B2 | 4/2007 | Chiu et al. |
| 7,206,568 B2 | 4/2007 | Sudit |
| 7,227,937 B1 | 6/2007 | Yoakum et al. |
| 7,237,002 B1 | 6/2007 | Estrada et al. |
| 7,240,089 B2 | 7/2007 | Boudreau |
| 7,269,426 B2 | 9/2007 | Kokkonen et al. |
| 7,280,658 B2 | 10/2007 | Amini et al. |
| 7,315,823 B2 | 1/2008 | Brondrup |
| 7,349,768 B2 | 3/2008 | Bruce et al. |
| 7,356,564 B2 | 4/2008 | Hartselle et al. |
| 7,394,345 B1 | 7/2008 | Ehlinger et al. |
| 7,411,493 B2 | 8/2008 | Smith |
| 7,423,580 B2 | 9/2008 | Markhovsky et al. |
| 7,454,442 B2 | 11/2008 | Cobleigh et al. |
| 7,508,419 B2 | 3/2009 | Toyama et al. |
| 7,512,649 B2 | 3/2009 | Faybishenko et al. |
| 7,519,670 B2 | 4/2009 | Hagale et al. |
| 7,535,890 B2 | 5/2009 | Rojas |
| 7,546,554 B2 | 6/2009 | Chiu et al. |
| 7,607,096 B2 | 10/2009 | Oreizy et al. |
| 7,639,943 B1 | 12/2009 | Kalajan |
| 7,650,231 B2 | 1/2010 | Gadler |
| 7,668,537 B2 | 2/2010 | DeVries |
| 7,770,137 B2 | 8/2010 | Forbes et al. |
| 7,778,973 B2 | 8/2010 | Choi |
| 7,779,444 B2 | 8/2010 | Glad |
| 7,787,886 B2 | 8/2010 | Markhovsky et al. |
| 7,796,946 B2 | 9/2010 | Eisenbach |
| 7,801,954 B2 | 9/2010 | Cadiz et al. |
| 7,856,360 B2 | 12/2010 | Kramer et al. |
| 7,971,156 B2 | 6/2011 | Albertson et al. |
| 7,996,793 B2 | 8/2011 | Latta et al. |
| 8,001,204 B2 | 8/2011 | Burtner et al. |
| 8,032,586 B2 | 10/2011 | Challenger et al. |
| 8,082,255 B1 | 12/2011 | Carlson, Jr. et al. |
| 8,090,351 B2 | 1/2012 | Klein |
| 8,098,904 B2 | 1/2012 | Ioffe et al. |
| 8,099,109 B2 | 1/2012 | Altman et al. |
| 8,112,716 B2 | 2/2012 | Kobayashi |
| 8,131,597 B2 | 3/2012 | Hudetz |
| 8,135,166 B2 | 3/2012 | Rhoads |
| 8,136,028 B1 | 3/2012 | Loeb et al. |
| 8,146,001 B1 | 3/2012 | Reese |
| 8,161,115 B2 | 4/2012 | Yamamoto |
| 8,161,417 B1 | 4/2012 | Lee |
| 8,195,203 B1 | 6/2012 | Tseng |
| 8,199,747 B2 | 6/2012 | Rojas et al. |
| 8,208,943 B2 | 6/2012 | Petersen |
| 8,214,443 B2 | 7/2012 | Hamburg |
| 8,234,350 B1 | 7/2012 | Gu et al. |
| 8,276,092 B1 | 9/2012 | Narayanan et al. |
| 8,279,319 B2 | 10/2012 | Date |
| 8,280,406 B2 | 10/2012 | Ziskind et al. |
| 8,285,199 B2 | 10/2012 | Hsu et al. |
| 8,287,380 B2 | 10/2012 | Nguyen et al. |
| 8,301,159 B2 | 10/2012 | Hamynen et al. |
| 8,306,922 B1 | 11/2012 | Kunal et al. |
| 8,312,086 B2 | 11/2012 | Velusamy et al. |
| 8,312,097 B1 | 11/2012 | Siegel et al. |
| 8,326,315 B2 | 12/2012 | Phillips et al. |
| 8,326,327 B2 | 12/2012 | Hymel et al. |
| 8,332,475 B2 | 12/2012 | Rosen et al. |
| 8,352,546 B1 | 1/2013 | Dollard |
| 8,379,130 B2 | 2/2013 | Forutanpour et al. |
| 8,385,950 B1 | 2/2013 | Wagner et al. |
| 8,402,097 B2 | 3/2013 | Szeto |
| 8,405,773 B2 | 3/2013 | Hayashi et al. |
| 8,418,067 B2 | 4/2013 | Cheng et al. |
| 8,423,409 B2 | 4/2013 | Rao |
| 8,471,914 B2 | 6/2013 | Sakiyama et al. |
| 8,472,935 B1 | 6/2013 | Fujisaki |
| 8,487,938 B2 | 7/2013 | Latta et al. |
| 8,510,383 B2 | 8/2013 | Hurley et al. |
| 8,527,345 B2 | 9/2013 | Rothschild et al. |

(56) References Cited

U.S. PATENT DOCUMENTS

| | | |
|---|---|---|
| 8,554,627 B2 | 10/2013 | Svendsen et al. |
| 8,560,612 B2 | 10/2013 | Kilmer et al. |
| 8,594,680 B2 | 11/2013 | Ledlie et al. |
| 8,613,089 B1 | 12/2013 | Holloway et al. |
| 8,660,358 B1 | 2/2014 | Bergboer et al. |
| 8,660,369 B2 | 2/2014 | Llano et al. |
| 8,660,793 B2 | 2/2014 | Ngo et al. |
| 8,682,350 B2 | 3/2014 | Altman et al. |
| 8,718,333 B2 | 5/2014 | Wolf et al. |
| 8,724,622 B2 | 5/2014 | Rojas |
| 8,732,168 B2 | 5/2014 | Johnson |
| 8,744,523 B2 | 6/2014 | Fan et al. |
| 8,745,132 B2 | 6/2014 | Obradovich |
| 8,761,800 B2 | 6/2014 | Kuwahara |
| 8,768,876 B2 | 7/2014 | Shim et al. |
| 8,775,972 B2 | 7/2014 | Spiegel |
| 8,788,680 B1 | 7/2014 | Naik |
| 8,790,187 B2 | 7/2014 | Walker et al. |
| 8,797,415 B2 | 8/2014 | Arnold |
| 8,798,646 B1 | 8/2014 | Wang et al. |
| 8,856,349 B2 | 10/2014 | Jain et al. |
| 8,856,691 B2 | 10/2014 | Geisner et al. |
| 8,874,677 B2 | 10/2014 | Rosen et al. |
| 8,886,227 B2 | 11/2014 | Schmidt et al. |
| 8,909,679 B2 | 12/2014 | Root et al. |
| 8,909,725 B1 | 12/2014 | Sehn |
| 8,972,357 B2 | 3/2015 | Shim et al. |
| 8,995,433 B2 | 3/2015 | Rojas |
| 9,015,285 B1 | 4/2015 | Ebsen et al. |
| 9,020,745 B2 | 4/2015 | Johnston et al. |
| 9,040,574 B2 | 5/2015 | Wang et al. |
| 9,055,416 B2 | 6/2015 | Rosen et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,119,027 B2 | 8/2015 | Sharon et al. |
| 9,123,074 B2 | 9/2015 | Jacobs et al. |
| 9,143,382 B2 | 9/2015 | Bhogal et al. |
| 9,143,681 B1 | 9/2015 | Ebsen et al. |
| 9,152,477 B1 | 10/2015 | Campbell et al. |
| 9,191,776 B2 | 11/2015 | Root et al. |
| 9,204,252 B2 | 12/2015 | Root |
| 9,225,897 B1 | 12/2015 | Sehn et al. |
| 9,230,160 B1 | 1/2016 | Kanter |
| 9,258,459 B2 | 2/2016 | Hartley |
| 9,276,886 B1 | 3/2016 | Samaranayake |
| 9,344,606 B2 | 5/2016 | Hartley et al. |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,430,783 B1 | 8/2016 | Sehn |
| 9,439,041 B2 | 9/2016 | Parvizi et al. |
| 9,443,227 B2 | 9/2016 | Evans et al. |
| 9,450,907 B2 | 9/2016 | Pridmore et al. |
| 9,459,778 B2 | 10/2016 | Hogeg et al. |
| 9,489,661 B2 | 11/2016 | Evans et al. |
| 9,491,134 B2 | 11/2016 | Rosen et al. |
| 9,532,171 B2 | 12/2016 | Allen et al. |
| 9,537,811 B2 | 1/2017 | Allen et al. |
| 9,628,950 B1 | 4/2017 | Noeth et al. |
| 9,705,831 B2 | 7/2017 | Spiegel |
| 9,710,821 B2 | 7/2017 | Heath |
| 9,742,713 B2 | 8/2017 | Spiegel et al. |
| 9,854,219 B2 | 12/2017 | Sehn |
| 10,102,423 B2 | 10/2018 | Shaburov et al. |
| 10,284,508 B1 | 5/2019 | Allen et al. |
| 10,439,972 B1 | 10/2019 | Spiegel et al. |
| 10,509,466 B1 | 12/2019 | Miller et al. |
| 10,514,876 B2 | 12/2019 | Sehn |
| 10,579,869 B1 | 3/2020 | Xiong et al. |
| 10,591,730 B2 | 3/2020 | Rodriguez, II et al. |
| 10,614,855 B2 | 4/2020 | Huang |
| 10,674,311 B1 | 6/2020 | Bouba et al. |
| 10,748,347 B1 | 8/2020 | Li et al. |
| 10,838,488 B2 * | 11/2020 | Gibson .................. G06F 3/011 |
| 10,893,385 B1 | 1/2021 | Berardino et al. |
| 10,936,066 B1 | 3/2021 | Jaureguiberry et al. |
| 10,939,246 B1 | 3/2021 | Dancie et al. |
| 10,945,098 B2 | 3/2021 | Dancie et al. |
| 10,958,608 B1 | 3/2021 | Allen et al. |
| 10,962,809 B1 | 3/2021 | Castañeda |
| 10,996,846 B2 | 5/2021 | Robertson et al. |
| 10,997,787 B2 | 5/2021 | Ge et al. |
| 11,012,390 B1 | 5/2021 | Majid et al. |
| 11,030,454 B1 | 6/2021 | Xiong et al. |
| 11,032,670 B1 | 6/2021 | Baylin et al. |
| 11,036,368 B1 | 6/2021 | Al Majid et al. |
| 11,039,270 B2 | 6/2021 | Bouba et al. |
| 11,062,498 B1 | 7/2021 | Voss et al. |
| 11,087,728 B1 | 8/2021 | Canberk et al. |
| 11,092,998 B1 | 8/2021 | Castañeda et al. |
| 11,106,342 B1 | 8/2021 | Majid et al. |
| 11,126,206 B2 | 9/2021 | Meisenholder et al. |
| 11,132,827 B2 * | 9/2021 | Gladkov .................. G06F 3/011 |
| 11,143,867 B2 | 10/2021 | Rodriguez, II |
| 11,166,123 B1 | 11/2021 | Guillaume |
| 11,169,600 B1 | 11/2021 | Canberk et al. |
| 11,227,626 B1 | 1/2022 | Krishnan Gorumkonda et al. |
| 11,275,439 B2 | 3/2022 | Jaureguiberry et al. |
| 11,294,936 B1 | 4/2022 | Jaureguiberry |
| 11,307,747 B2 | 4/2022 | Dancie et al. |
| 11,531,402 B1 | 12/2022 | Stolzenberg |
| 11,546,505 B2 | 1/2023 | Canberk |
| 2002/0047868 A1 | 4/2002 | Miyazawa |
| 2002/0078456 A1 | 6/2002 | Hudson et al. |
| 2002/0087631 A1 | 7/2002 | Sharma |
| 2002/0097257 A1 | 7/2002 | Miller et al. |
| 2002/0122659 A1 | 9/2002 | Mcgrath et al. |
| 2002/0128047 A1 | 9/2002 | Gates |
| 2002/0144154 A1 | 10/2002 | Tomkow |
| 2003/0001846 A1 | 1/2003 | Davis et al. |
| 2003/0016247 A1 | 1/2003 | Lai et al. |
| 2003/0017823 A1 | 1/2003 | Mager et al. |
| 2003/0020623 A1 | 1/2003 | Cao et al. |
| 2003/0023874 A1 | 1/2003 | Prokupets et al. |
| 2003/0037124 A1 | 2/2003 | Yamaura et al. |
| 2003/0052925 A1 | 3/2003 | Daimon et al. |
| 2003/0101230 A1 | 5/2003 | Benschoter et al. |
| 2003/0110503 A1 | 6/2003 | Perkes |
| 2003/0126215 A1 | 7/2003 | Udell |
| 2003/0148773 A1 | 8/2003 | Spriestersbach et al. |
| 2003/0164856 A1 | 9/2003 | Prager et al. |
| 2003/0229607 A1 | 12/2003 | Zellweger et al. |
| 2004/0027371 A1 | 2/2004 | Jaeger |
| 2004/0064429 A1 | 4/2004 | Hirstius et al. |
| 2004/0078367 A1 | 4/2004 | Anderson et al. |
| 2004/0111467 A1 | 6/2004 | Willis |
| 2004/0158739 A1 | 8/2004 | Wakai et al. |
| 2004/0189465 A1 | 9/2004 | Capobianco et al. |
| 2004/0203959 A1 | 10/2004 | Coombes |
| 2004/0215625 A1 | 10/2004 | Svendsen et al. |
| 2004/0243531 A1 | 12/2004 | Dean |
| 2004/0243688 A1 | 12/2004 | Wugofski |
| 2005/0021444 A1 | 1/2005 | Bauer et al. |
| 2005/0022211 A1 | 1/2005 | Veselov et al. |
| 2005/0048989 A1 | 3/2005 | Jung |
| 2005/0078804 A1 | 4/2005 | Yomoda |
| 2005/0097176 A1 | 5/2005 | Schatz et al. |
| 2005/0102381 A1 | 5/2005 | Jiang et al. |
| 2005/0104976 A1 | 5/2005 | Currans |
| 2005/0114783 A1 | 5/2005 | Szeto |
| 2005/0119936 A1 | 6/2005 | Buchanan et al. |
| 2005/0122405 A1 | 6/2005 | Voss et al. |
| 2005/0193340 A1 | 9/2005 | Amburgey et al. |
| 2005/0193345 A1 | 9/2005 | Klassen et al. |
| 2005/0198128 A1 | 9/2005 | Anderson |
| 2005/0223066 A1 | 10/2005 | Buchheit et al. |
| 2005/0288954 A1 | 12/2005 | McCarthy et al. |
| 2006/0026067 A1 | 2/2006 | Nicholas et al. |
| 2006/0107297 A1 | 5/2006 | Toyama et al. |
| 2006/0114338 A1 | 6/2006 | Rothschild |
| 2006/0119882 A1 | 6/2006 | Harris et al. |

(56) References Cited

U.S. PATENT DOCUMENTS

| | | |
|---|---|---|
| 2006/0242239 A1 | 10/2006 | Morishima et al. |
| 2006/0252438 A1 | 11/2006 | Ansamaa et al. |
| 2006/0265417 A1 | 11/2006 | Amato et al. |
| 2006/0270419 A1 | 11/2006 | Crowley et al. |
| 2006/0287878 A1 | 12/2006 | Wadhwa et al. |
| 2007/0004426 A1 | 1/2007 | Pfleging et al. |
| 2007/0038715 A1 | 2/2007 | Collins et al. |
| 2007/0040931 A1 | 2/2007 | Nishizawa |
| 2007/0073517 A1 | 3/2007 | Panje |
| 2007/0073823 A1 | 3/2007 | Cohen et al. |
| 2007/0075898 A1 | 4/2007 | Markhovsky et al. |
| 2007/0082707 A1 | 4/2007 | Flynt et al. |
| 2007/0136228 A1 | 6/2007 | Petersen |
| 2007/0192128 A1 | 8/2007 | Celestini |
| 2007/0198340 A1 | 8/2007 | Lucovsky et al. |
| 2007/0198495 A1 | 8/2007 | Buron et al. |
| 2007/0208751 A1 | 9/2007 | Cowan et al. |
| 2007/0210936 A1 | 9/2007 | Nicholson |
| 2007/0214180 A1 | 9/2007 | Crawford |
| 2007/0214216 A1 | 9/2007 | Carrer et al. |
| 2007/0233556 A1 | 10/2007 | Koningstein |
| 2007/0233801 A1 | 10/2007 | Eren et al. |
| 2007/0233859 A1 | 10/2007 | Zhao et al. |
| 2007/0243887 A1 | 10/2007 | Bandhole et al. |
| 2007/0244750 A1 | 10/2007 | Grannan et al. |
| 2007/0255456 A1 | 11/2007 | Funayama |
| 2007/0281690 A1 | 12/2007 | Altman et al. |
| 2008/0022329 A1 | 1/2008 | Glad |
| 2008/0025701 A1 | 1/2008 | Ikeda |
| 2008/0032703 A1 | 2/2008 | Krumm et al. |
| 2008/0033930 A1 | 2/2008 | Warren |
| 2008/0043041 A2 | 2/2008 | Hedenstroem et al. |
| 2008/0049704 A1 | 2/2008 | Witteman et al. |
| 2008/0062141 A1 | 3/2008 | Chandhri |
| 2008/0076505 A1 | 3/2008 | Ngyen et al. |
| 2008/0092233 A1 | 4/2008 | Tian et al. |
| 2008/0094387 A1 | 4/2008 | Chen |
| 2008/0104503 A1 | 5/2008 | Beall et al. |
| 2008/0109844 A1 | 5/2008 | Baldeschweiler et al. |
| 2008/0120409 A1 | 5/2008 | Sun et al. |
| 2008/0147730 A1 | 6/2008 | Lee et al. |
| 2008/0148150 A1 | 6/2008 | Mall |
| 2008/0158230 A1 | 7/2008 | Sharma et al. |
| 2008/0168033 A1 | 7/2008 | Ott et al. |
| 2008/0168489 A1 | 7/2008 | Schraga |
| 2008/0189177 A1 | 8/2008 | Anderton et al. |
| 2008/0207176 A1 | 8/2008 | Brackbill et al. |
| 2008/0208692 A1 | 8/2008 | Garaventi et al. |
| 2008/0214210 A1 | 9/2008 | Rasanen et al. |
| 2008/0222545 A1 | 9/2008 | Lemay |
| 2008/0255976 A1 | 10/2008 | Altberg et al. |
| 2008/0256446 A1 | 10/2008 | Yamamoto |
| 2008/0256577 A1 | 10/2008 | Funaki et al. |
| 2008/0266421 A1 | 10/2008 | Takahata et al. |
| 2008/0270938 A1 | 10/2008 | Carlson |
| 2008/0288338 A1 | 11/2008 | Wiseman et al. |
| 2008/0306826 A1 | 12/2008 | Kramer et al. |
| 2008/0313329 A1 | 12/2008 | Wang et al. |
| 2008/0313346 A1 | 12/2008 | Kujawa et al. |
| 2008/0318616 A1 | 12/2008 | Chipalkatti et al. |
| 2009/0006191 A1 | 1/2009 | Arankalle et al. |
| 2009/0006565 A1 | 1/2009 | Velusamy et al. |
| 2009/0012788 A1 | 1/2009 | Gilbert et al. |
| 2009/0015703 A1 | 1/2009 | Kim et al. |
| 2009/0024956 A1 | 1/2009 | Kobayashi |
| 2009/0030774 A1 | 1/2009 | Rothschild et al. |
| 2009/0030999 A1 | 1/2009 | Gatzke et al. |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0079846 A1 | 3/2009 | Chou |
| 2009/0089678 A1 | 4/2009 | Sacco et al. |
| 2009/0089710 A1 | 4/2009 | Wood et al. |
| 2009/0093261 A1 | 4/2009 | Ziskind |
| 2009/0132341 A1 | 5/2009 | Klinger |
| 2009/0132453 A1 | 5/2009 | Hangartner et al. |
| 2009/0132665 A1 | 5/2009 | Thomsen et al. |
| 2009/0148045 A1 | 6/2009 | Lee et al. |
| 2009/0153492 A1 | 6/2009 | Popp |
| 2009/0157450 A1 | 6/2009 | Athsani et al. |
| 2009/0157752 A1 | 6/2009 | Gonzalez |
| 2009/0160970 A1 | 6/2009 | Fredlund et al. |
| 2009/0163182 A1 | 6/2009 | Gatti et al. |
| 2009/0177299 A1 | 7/2009 | Van De Sluis |
| 2009/0192900 A1 | 7/2009 | Collision |
| 2009/0199242 A1 | 8/2009 | Johnson et al. |
| 2009/0215469 A1 | 8/2009 | Fisher et al. |
| 2009/0232354 A1 | 9/2009 | Camp, Jr. et al. |
| 2009/0234815 A1 | 9/2009 | Boerries et al. |
| 2009/0239552 A1 | 9/2009 | Churchill et al. |
| 2009/0249222 A1 | 10/2009 | Schmidt et al. |
| 2009/0249244 A1 | 10/2009 | Robinson et al. |
| 2009/0265647 A1 | 10/2009 | Martin et al. |
| 2009/0288022 A1 | 11/2009 | Almstrand et al. |
| 2009/0291672 A1 | 11/2009 | Treves et al. |
| 2009/0292608 A1 | 11/2009 | Polachek |
| 2009/0319607 A1 | 12/2009 | Belz et al. |
| 2009/0327073 A1 | 12/2009 | Li |
| 2010/0062794 A1 | 3/2010 | Han |
| 2010/0082427 A1 | 4/2010 | Burgener et al. |
| 2010/0082693 A1 | 4/2010 | Hugg et al. |
| 2010/0100568 A1 | 4/2010 | Papin et al. |
| 2010/0113065 A1 | 5/2010 | Narayan et al. |
| 2010/0130233 A1 | 5/2010 | Lansing |
| 2010/0131880 A1 | 5/2010 | Lee et al. |
| 2010/0131895 A1 | 5/2010 | Wohlert |
| 2010/0153144 A1 | 6/2010 | Miller et al. |
| 2010/0159944 A1 | 6/2010 | Pascal et al. |
| 2010/0161658 A1 | 6/2010 | Hamynen et al. |
| 2010/0161831 A1 | 6/2010 | Haas et al. |
| 2010/0162149 A1 | 6/2010 | Sheleheda et al. |
| 2010/0183280 A1 | 7/2010 | Beauregard et al. |
| 2010/0185552 A1 | 7/2010 | Deluca et al. |
| 2010/0185665 A1 | 7/2010 | Horn et al. |
| 2010/0191631 A1 | 7/2010 | Weidmann |
| 2010/0197318 A1 | 8/2010 | Petersen et al. |
| 2010/0197319 A1 | 8/2010 | Petersen et al. |
| 2010/0198683 A1 | 8/2010 | Aarabi |
| 2010/0198694 A1 | 8/2010 | Muthukrishnan |
| 2010/0198826 A1 | 8/2010 | Petersen et al. |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0201482 A1 | 8/2010 | Robertson et al. |
| 2010/0201536 A1 | 8/2010 | Robertson et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0250109 A1 | 9/2010 | Johnston et al. |
| 2010/0257196 A1 | 10/2010 | Waters et al. |
| 2010/0259386 A1 | 10/2010 | Holley et al. |
| 2010/0273509 A1 | 10/2010 | Sweeney et al. |
| 2010/0281045 A1 | 11/2010 | Dean |
| 2010/0306669 A1 | 12/2010 | Della Pasqua |
| 2011/0004071 A1 | 1/2011 | Faiola et al. |
| 2011/0010205 A1 | 1/2011 | Richards |
| 2011/0029512 A1 | 2/2011 | Folgner et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0064388 A1 | 3/2011 | Brown et al. |
| 2011/0066743 A1 | 3/2011 | Hurley et al. |
| 2011/0083101 A1 | 4/2011 | Sharon et al. |
| 2011/0102630 A1 | 5/2011 | Rukes |
| 2011/0119133 A1 | 5/2011 | Igelman et al. |
| 2011/0137881 A1 | 6/2011 | Cheng et al. |
| 2011/0145564 A1 | 6/2011 | Moshir et al. |
| 2011/0159890 A1 | 6/2011 | Fortescue et al. |
| 2011/0164163 A1 | 7/2011 | Bilbrey et al. |
| 2011/0197194 A1 | 8/2011 | D'Angelo et al. |
| 2011/0202598 A1 | 8/2011 | Evans et al. |
| 2011/0202968 A1 | 8/2011 | Nurmi |

(56) References Cited

U.S. PATENT DOCUMENTS

| | | |
|---|---|---|
| 2011/0211534 A1 | 9/2011 | Schmidt et al. |
| 2011/0213845 A1 | 9/2011 | Logan et al. |
| 2011/0215966 A1 | 9/2011 | Kim et al. |
| 2011/0225048 A1 | 9/2011 | Nair |
| 2011/0238763 A1 | 9/2011 | Shin et al. |
| 2011/0255736 A1 | 10/2011 | Thompson et al. |
| 2011/0273575 A1 | 11/2011 | Lee |
| 2011/0282799 A1 | 11/2011 | Huston |
| 2011/0283188 A1 | 11/2011 | Farrenkopf |
| 2011/0301934 A1 | 12/2011 | Tardif |
| 2011/0314419 A1 | 12/2011 | Dunn et al. |
| 2011/0320373 A1 | 12/2011 | Lee et al. |
| 2012/0028659 A1 | 2/2012 | Whitney et al. |
| 2012/0033718 A1 | 2/2012 | Kauffman et al. |
| 2012/0036015 A1 | 2/2012 | Sheikh |
| 2012/0036443 A1 | 2/2012 | Ohmori et al. |
| 2012/0054797 A1 | 3/2012 | Skog et al. |
| 2012/0059722 A1 | 3/2012 | Rao |
| 2012/0062805 A1 | 3/2012 | Candelore |
| 2012/0084731 A1 | 4/2012 | Filman et al. |
| 2012/0084835 A1 | 4/2012 | Thomas et al. |
| 2012/0099800 A1 | 4/2012 | Llano et al. |
| 2012/0108293 A1 | 5/2012 | Law et al. |
| 2012/0110096 A1 | 5/2012 | Smarr et al. |
| 2012/0113143 A1 | 5/2012 | Adhikari et al. |
| 2012/0113272 A1 | 5/2012 | Hata |
| 2012/0123830 A1 | 5/2012 | Svendsen et al. |
| 2012/0123871 A1 | 5/2012 | Svendsen et al. |
| 2012/0123875 A1 | 5/2012 | Svendsen et al. |
| 2012/0124126 A1 | 5/2012 | Alcazar et al. |
| 2012/0124176 A1 | 5/2012 | Curtis et al. |
| 2012/0124458 A1 | 5/2012 | Cruzada |
| 2012/0131507 A1 | 5/2012 | Sparandara et al. |
| 2012/0131512 A1 | 5/2012 | Takeuchi et al. |
| 2012/0143760 A1 | 6/2012 | Abulafia et al. |
| 2012/0150978 A1 | 6/2012 | Monaco |
| 2012/0165100 A1 | 6/2012 | Lalancette et al. |
| 2012/0166971 A1 | 6/2012 | Sachson et al. |
| 2012/0169855 A1 | 7/2012 | Oh |
| 2012/0172062 A1 | 7/2012 | Altman et al. |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0197724 A1 | 8/2012 | Kendall |
| 2012/0200743 A1 | 8/2012 | Blanchflower et al. |
| 2012/0209924 A1 | 8/2012 | Evans et al. |
| 2012/0210244 A1 | 8/2012 | De Francisco Lopez et al. |
| 2012/0212632 A1 | 8/2012 | Mate et al. |
| 2012/0220264 A1 | 8/2012 | Kawabata |
| 2012/0226748 A1 | 9/2012 | Bosworth et al. |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0250951 A1 | 10/2012 | Chen |
| 2012/0252418 A1 | 10/2012 | Kandekar et al. |
| 2012/0254325 A1 | 10/2012 | Majeti et al. |
| 2012/0278387 A1 | 11/2012 | Garcia et al. |
| 2012/0278692 A1 | 11/2012 | Shi |
| 2012/0290637 A1 | 11/2012 | Perantatos et al. |
| 2012/0299954 A1 | 11/2012 | Wada et al. |
| 2012/0304052 A1 | 11/2012 | Tanaka et al. |
| 2012/0304080 A1 | 11/2012 | Wormald et al. |
| 2012/0307096 A1 | 12/2012 | Ford et al. |
| 2012/0307112 A1 | 12/2012 | Kunishige et al. |
| 2012/0319904 A1 | 12/2012 | Lee et al. |
| 2012/0323933 A1 | 12/2012 | He et al. |
| 2012/0324018 A1 | 12/2012 | Metcalf et al. |
| 2013/0006759 A1 | 1/2013 | Srivastava et al. |
| 2013/0024757 A1 | 1/2013 | Doll et al. |
| 2013/0036364 A1 | 2/2013 | Johnson |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0080254 A1 | 3/2013 | Thramann |
| 2013/0085790 A1 | 4/2013 | Palmer et al. |
| 2013/0086072 A1 | 4/2013 | Peng et al. |
| 2013/0090171 A1 | 4/2013 | Holton et al. |
| 2013/0095857 A1 | 4/2013 | Garcia et al. |
| 2013/0104053 A1 | 4/2013 | Thornton et al. |
| 2013/0110885 A1 | 5/2013 | Brundrett, III |
| 2013/0111514 A1 | 5/2013 | Slavin et al. |
| 2013/0128059 A1 | 5/2013 | Kristensson |
| 2013/0129252 A1 | 5/2013 | Lauper |
| 2013/0132477 A1 | 5/2013 | Bosworth et al. |
| 2013/0145286 A1 | 6/2013 | Feng et al. |
| 2013/0159110 A1 | 6/2013 | Rajaram et al. |
| 2013/0159919 A1 | 6/2013 | Leydon |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0191198 A1 | 7/2013 | Carlson et al. |
| 2013/0194301 A1 | 8/2013 | Robbins et al. |
| 2013/0198176 A1 | 8/2013 | Kim |
| 2013/0218965 A1 | 8/2013 | Abrol et al. |
| 2013/0218968 A1 | 8/2013 | Mcevilly et al. |
| 2013/0222323 A1 | 8/2013 | Mckenzie |
| 2013/0227476 A1 | 8/2013 | Frey |
| 2013/0232194 A1 | 9/2013 | Knapp et al. |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0275505 A1 | 10/2013 | Gauglitz et al. |
| 2013/0290443 A1 | 10/2013 | Collins et al. |
| 2013/0304646 A1 | 11/2013 | De Geer |
| 2013/0311255 A1 | 11/2013 | Cummins et al. |
| 2013/0325964 A1 | 12/2013 | Berberat |
| 2013/0344896 A1 | 12/2013 | Kirmse et al. |
| 2013/0346869 A1 | 12/2013 | Asver et al. |
| 2013/0346877 A1 | 12/2013 | Borovoy et al. |
| 2014/0006129 A1 | 1/2014 | Heath |
| 2014/0011538 A1 | 1/2014 | Mulcahy et al. |
| 2014/0019264 A1 | 1/2014 | Wachman et al. |
| 2014/0032682 A1 | 1/2014 | Prado et al. |
| 2014/0043204 A1 | 2/2014 | Basnayake et al. |
| 2014/0045530 A1 | 2/2014 | Gordon et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0082651 A1 | 3/2014 | Sharifi |
| 2014/0092130 A1 | 4/2014 | Anderson et al. |
| 2014/0096029 A1 | 4/2014 | Schultz |
| 2014/0114565 A1 | 4/2014 | Aziz et al. |
| 2014/0122658 A1 | 5/2014 | Haeger et al. |
| 2014/0122787 A1 | 5/2014 | Shalvi et al. |
| 2014/0129953 A1 | 5/2014 | Spiegel |
| 2014/0143143 A1 | 5/2014 | Fasoli et al. |
| 2014/0149519 A1 | 5/2014 | Redfern et al. |
| 2014/0155102 A1 | 6/2014 | Cooper et al. |
| 2014/0171036 A1 | 6/2014 | Simmons |
| 2014/0173424 A1 | 6/2014 | Hogeg et al. |
| 2014/0173457 A1 | 6/2014 | Wang et al. |
| 2014/0189592 A1 | 7/2014 | Benchenaa et al. |
| 2014/0207679 A1 | 7/2014 | Cho |
| 2014/0214471 A1 | 7/2014 | Schreiner, III |
| 2014/0222564 A1 | 8/2014 | Kranendonk et al. |
| 2014/0258405 A1 | 9/2014 | Perkin |
| 2014/0265359 A1 | 9/2014 | Cheng et al. |
| 2014/0266703 A1 | 9/2014 | Dalley, Jr. et al. |
| 2014/0279061 A1 | 9/2014 | Elimeliah et al. |
| 2014/0279436 A1 | 9/2014 | Dorsey et al. |
| 2014/0279540 A1 | 9/2014 | Jackson |
| 2014/0280537 A1 | 9/2014 | Pridmore et al. |
| 2014/0282096 A1 | 9/2014 | Rubinstein et al. |

(56) References Cited

U.S. PATENT DOCUMENTS

| | | |
|---|---|---|
| 2014/0287779 A1 | 9/2014 | O'keefe et al. |
| 2014/0289833 A1 | 9/2014 | Briceno |
| 2014/0306986 A1 | 10/2014 | Gottesman et al. |
| 2014/0317302 A1 | 10/2014 | Naik |
| 2014/0324627 A1 | 10/2014 | Haver et al. |
| 2014/0324629 A1 | 10/2014 | Jacobs |
| 2014/0325383 A1 | 10/2014 | Brown et al. |
| 2015/0020086 A1 | 1/2015 | Chen et al. |
| 2015/0046278 A1 | 2/2015 | Pei et al. |
| 2015/0071619 A1 | 3/2015 | Brough |
| 2015/0087263 A1 | 3/2015 | Branscomb et al. |
| 2015/0088622 A1 | 3/2015 | Ganschow et al. |
| 2015/0095020 A1 | 4/2015 | Loydon |
| 2015/0096042 A1 | 4/2015 | Mizrachi |
| 2015/0116529 A1 | 4/2015 | Wu et al. |
| 2015/0120293 A1 | 4/2015 | Wohlert et al. |
| 2015/0169827 A1 | 6/2015 | Laborde |
| 2015/0172534 A1 | 6/2015 | Miyakawaa et al. |
| 2015/0178260 A1 | 6/2015 | Brunson |
| 2015/0222814 A1 | 8/2015 | Li et al. |
| 2015/0261917 A1 | 9/2015 | Smith |
| 2015/0312184 A1 | 10/2015 | Langholz et al. |
| 2015/0350136 A1 | 12/2015 | Flynn, III et al. |
| 2015/0365795 A1 | 12/2015 | Allen et al. |
| 2015/0370320 A1 | 12/2015 | Connor |
| 2015/0378502 A1 | 12/2015 | Hu et al. |
| 2016/0006927 A1 | 1/2016 | Sehn |
| 2016/0014063 A1 | 1/2016 | Hogeg et al. |
| 2016/0085773 A1 | 3/2016 | Chang et al. |
| 2016/0085863 A1 | 3/2016 | Allen et al. |
| 2016/0099901 A1 | 4/2016 | Allen et al. |
| 2016/0180887 A1 | 6/2016 | Sehn |
| 2016/0182422 A1 | 6/2016 | Sehn et al. |
| 2016/0182875 A1 | 6/2016 | Sehn |
| 2016/0239248 A1 | 8/2016 | Sehn |
| 2016/0277419 A1 | 9/2016 | Allen et al. |
| 2016/0321708 A1 | 11/2016 | Sehn |
| 2017/0006094 A1 | 1/2017 | Abou Mahmoud et al. |
| 2017/0061308 A1 | 3/2017 | Chen et al. |
| 2017/0123487 A1 | 5/2017 | Hazra et al. |
| 2017/0277684 A1 | 9/2017 | Dharmarajan Mary |
| 2017/0277685 A1 | 9/2017 | Takumi |
| 2017/0287006 A1 | 10/2017 | Azmoodeh et al. |
| 2017/0351910 A1 | 12/2017 | Elwazer et al. |
| 2018/0158370 A1 | 6/2018 | Pryor |
| 2019/0146219 A1 | 5/2019 | Rodriguez, II |
| 2020/0314586 A1 | 10/2020 | Bouba et al. |
| 2020/0382912 A1 | 12/2020 | Dancie et al. |
| 2020/0401225 A1 | 12/2020 | Jaureguiberry et al. |
| 2021/0011612 A1 | 1/2021 | Dancie et al. |
| 2021/0074016 A1 | 3/2021 | Li et al. |
| 2021/0132694 A1* | 5/2021 | Osman .................. G06F 3/011 |
| 2021/0152979 A1 | 5/2021 | Berardino et al. |
| 2021/0166732 A1 | 6/2021 | Shaburova et al. |
| 2021/0174034 A1 | 6/2021 | Retek et al. |
| 2021/0241529 A1 | 8/2021 | Cowburn et al. |
| 2021/0266704 A1 | 8/2021 | Dancie et al. |
| 2021/0303075 A1 | 9/2021 | Cowburn et al. |
| 2021/0303077 A1 | 9/2021 | Anvaripour et al. |
| 2021/0303140 A1 | 9/2021 | Mourkogiannis |
| 2021/0349676 A1* | 11/2021 | Sommer ................. A63F 13/35 |
| 2021/0377693 A1 | 12/2021 | Bouba et al. |
| 2021/0382564 A1 | 12/2021 | Blachly et al. |
| 2021/0397000 A1 | 12/2021 | Rodriguez, II |
| 2021/0405761 A1 | 12/2021 | Canberk |
| 2021/0409904 A1 | 12/2021 | Baylin et al. |
| 2022/0174455 A1 | 6/2022 | Guillaume |
| 2022/0188539 A1 | 6/2022 | Chan et al. |
| 2022/0206588 A1 | 6/2022 | Canberk et al. |
| 2022/0269345 A1 | 8/2022 | Jaureguiberry et al. |
| 2022/0300730 A1 | 9/2022 | Eirinberg et al. |
| 2022/0300731 A1 | 9/2022 | Eirinberg et al. |
| 2022/0301231 A1 | 9/2022 | Eirinberg et al. |
| 2022/0326781 A1 | 10/2022 | Hwang et al. |
| 2022/0334649 A1 | 10/2022 | Hwang et al. |
| 2022/0375174 A1 | 11/2022 | Arya et al. |

FOREIGN PATENT DOCUMENTS

| | | |
|---|---|---|
| EP | 2051480 A1 | 4/2009 |
| EP | 2151797 A1 | 2/2010 |
| EP | 3707693 A1 | 9/2020 |
| EP | 4172726 A1 | 5/2023 |
| EP | 4172730 A1 | 5/2023 |
| GB | 2399928 A | 9/2004 |
| KR | 19990073076 A | 10/1999 |
| KR | 20010078417 A | 8/2001 |
| KR | 20220158824 A | 12/2022 |
| WO | WO-1996024213 A1 | 8/1996 |
| WO | WO-1999063453 A1 | 12/1999 |
| WO | WO-2000058882 A1 | 10/2000 |
| WO | WO-2001029642 A1 | 4/2001 |
| WO | WO-2001050703 A3 | 7/2001 |
| WO | WO-2006118755 A2 | 11/2006 |
| WO | WO-2007092668 A2 | 8/2007 |
| WO | WO-2009043020 A2 | 4/2009 |
| WO | WO-2011040821 A1 | 4/2011 |
| WO | WO-2011119407 A1 | 9/2011 |
| WO | WO-2013008238 A1 | 1/2013 |
| WO | WO-2013045753 A1 | 4/2013 |
| WO | WO-2014006129 A1 | 1/2014 |
| WO | WO-2014068573 A1 | 5/2014 |
| WO | WO-2014115136 A1 | 7/2014 |
| WO | WO-2014194262 A2 | 12/2014 |
| WO | WO-2015192026 A1 | 12/2015 |
| WO | WO-2016044424 A1 | 3/2016 |
| WO | WO-2016054562 A1 | 4/2016 |
| WO | WO-2016065131 A1 | 4/2016 |
| WO | WO-2016100318 A2 | 6/2016 |
| WO | WO-2016100318 A3 | 6/2016 |
| WO | WO-2016100342 A1 | 6/2016 |
| WO | WO-2016149594 A1 | 9/2016 |
| WO | WO-2016168591 A1 | 10/2016 |
| WO | WO-2016179166 A1 | 11/2016 |
| WO | WO-2019094618 A1 | 5/2019 |
| WO | WO-2019143572 A1 | 7/2019 |
| WO | WO-2022005687 A1 | 1/2022 |
| WO | WO-2022005693 A1 | 1/2022 |
| WO | WO-2022060549 A2 | 3/2022 |
| WO | WO-2022066578 A1 | 3/2022 |
| WO | WO-2022060549 A3 | 4/2022 |
| WO | WO-2022132381 A1 | 6/2022 |
| WO | WO-2022146678 A1 | 7/2022 |
| WO | WO-2022198182 A1 | 9/2022 |
| WO | WO-2022216784 A1 | 10/2022 |
| WO | WO-2022225761 A1 | 10/2022 |
| WO | WO-2022245675 A1 | 11/2022 |

OTHER PUBLICATIONS

"Adding photos to your listing", eBay, [Online] Retrieved from the Internet: <URL: http://pages.ebay.com/help/sell/pictures.html>, (accessed May 24, 2017), 4 pgs.

"BlogStomp", StompSoftware, [Online] Retrieved from the Internet: <URL: http://stompsoftware.com/blogstomp>, (accessed May 24, 2017), 12 pgs.

"Cup Magic Starbucks Holiday Red Cups come to life with AR app", Blast Radius, [Online] Retrieved from the Internet: <URL: https://web.archive.org/web/20160711202454/http://www.blastradius.com/work/cup-magic>, (2016), 7 pgs.

"Daily App: InstaPlace (iOS/Android): Give Pictures a Sense of Place", TechPP, [Online] Retrieved from the Internet: <URL: http://techpp.com/2013/02/15/instaplace-app-review>, (2013), 13 pgs.

"InstaPlace Photo App Tell The Whole Story", [Online] Retrieved from the Internet: <URL: youtu.be/uF_gFkg1hBM>, (Nov. 8, 2013), 113 pgs., 1:02 min.

"International Application Serial No. PCT/US2015/037251, International Search Report mailed Sep. 29, 2015", 2 pgs.

(56) References Cited

OTHER PUBLICATIONS

"Introducing Snapchat Stories", [Online] Retrieved from the Internet: <URL: https://web.archive.org/web/20131026084921/https://www.youtube.com/watch?v=88Cu3yN-LIM>, (Oct. 3, 2013), 92 pgs.; 00:47 min.
"Macy's Believe-o-Magic", [Online] Retrieved from the Internet: <URL: https://web.archive.org/web/20190422101854/https://www.youtube.com/watch?v=xvzRXy3J0Z0&feature=youtu.be>, (Nov. 7, 2011), 102 pgs.; 00:51 min.
"Macy's Introduces Augmented Reality Experience in Stores across Country as Part of Its 2011 Believe Campaign", Business Wire, [Online] Retrieved from the Internet: <URL: https://www.businesswire.com/news/home/20111102006759/en/Macys-Introduces-Augmented-Reality-Experience-Stores-Country>, (Nov. 2, 2011), 6 pgs.
"Starbucks Cup Magic", [Online] Retrieved from the Internet: <URL: https://www.youtube.com/watch?v=RWwQXi9RG0w>, (Nov. 8, 2011), 87 pgs.; 00:47 min.
"Starbucks Cup Magic for Valentine's Day", [Online] Retrieved from the Internet: <URL: https://www.youtube.com/watch?v=8nvqOzjq10w>, (Feb. 6, 2012), 88 pgs.; 00:45 min.
"Starbucks Holiday Red Cups Come to Life, Signaling the Return of the Merriest Season", Business Wire, [Online] Retrieved from the Internet: <URL: http://www.businesswire.com/news/home/20111115005744/en/2479513/Starbucks-Holiday-Red-Cups-Life-Signaling-Return>, (Nov. 15, 2011), 5 pgs.
Carthy, Roi, "Dear All Photo Apps: Mobli Just Won Filters", TechCrunch, [Online] Retrieved from the Internet: <URL: https://techcrunch.com/2011/09/08/mobli-filters>, (Sep. 8, 2011), 10 pgs.
Janthong, Isaranu, "Instaplace ready on Android Google Play store", Android App Review Thailand, [Online] Retrieved from the Internet: <URL: http://www.android-free-app-review.com/2013/01/instaplace-android-google-play-store.html>, (Jan. 23, 2013), 9 pgs.
MacLeod, Duncan, "Macys Believe-o-Magic App", [Online] Retrieved from the Internet: <URL: http://theinspirationroom.com/daily/2011/macys-believe-o-magic-app>, (Nov. 14, 2011), 10 pgs.
MacLeod, Duncan, "Starbucks Cup Magic Lets Merry", [Online] Retrieved from the Internet: <URL: http://theinspirationroom.com/daily/2011/starbucks-cup-magic>, (Nov. 12, 2011), 8 pgs.
Notopoulos, Katie, "A Guide To The New Snapchat Filters And Big Fonts", [Online] Retrieved from the Internet: <URL: https://www.buzzfeed.com/katienotopoulos/a-guide-to-the-new-snapchat-filters-and-big-fonts?utm_term=.bkQ9qVZWe#.nv58YXpkV>, (Dec. 22, 2013), 13 pgs.
Panzarino, Matthew, "Snapchat Adds Filters, A Replay Function And For Whatever Reason, Time, Temperature And Speed Overlays", TechCrunch, [Online] Retrieved form the Internet: <URL: https://techcrunch.com/2013/12/20/snapchat-adds-filters-new-font-and-for-some-reason-time-temperature-and-speed-overlays/>, (Dec. 20, 2013), 12 pgs.
Tripathi, Rohit, "Watermark Images in PHP And Save File on Server", [Online] Retrieved from the Internet: <URL: http://code.rohitink.com/2012/12/28/watermark-images-in-php-and-save-file-on-server>, (Dec. 28, 2012), 4 pgs.
"International Application Serial No. PCT/US2024/017742, International Search Report mailed Jun. 4, 2024", 3 pgs.
"International Application Serial No. PCT/US2024/017742, Written Opinion mailed Jun. 4, 2024", 8 pgs.

* cited by examiner

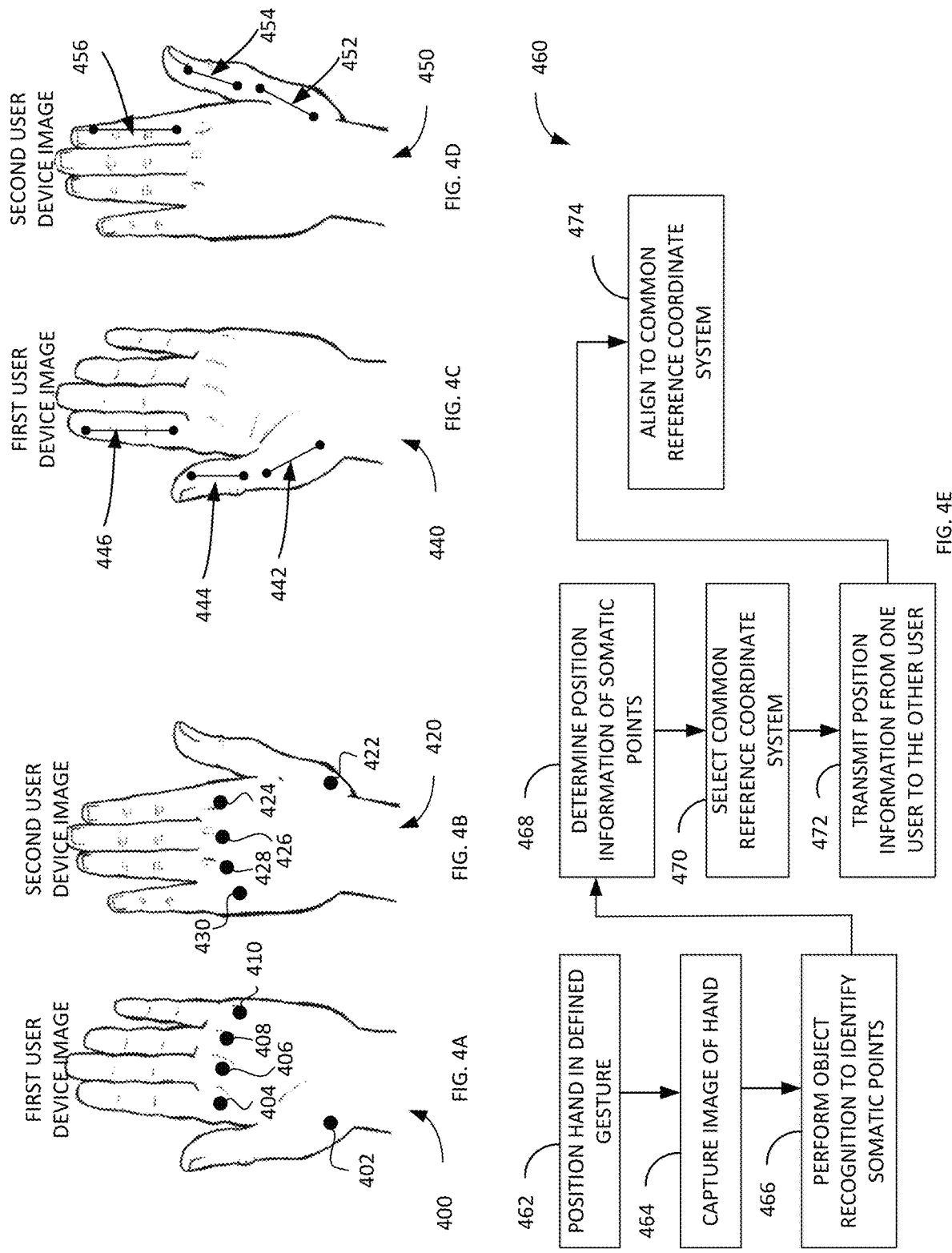

SHARED AUGMENTED REALITY EYEWEAR DEVICE WITH HAND TRACKING ALIGNMENT

CLAIM OF PRIORITY

This application claims the benefit of priority to Greece Patent Application Serial No. 20230100168, filed on Feb. 28, 2023, which is incorporated herein by reference in its entirety.

TECHNICAL FIELD

The present disclosure relates generally to augmented reality devices and, more particularly, to alignment of multiple mobile devices using somatic alignment markers.

BACKGROUND

A head-wearable apparatus may be implemented with a transparent or semi-transparent display through which a user of the head-wearable apparatus can view the surrounding environment. Such head-wearable apparatuses enable a user to see through the transparent or semi-transparent display to view the surrounding environment, and to also see objects (e.g., virtual objects such as a rendering of a 2D or 3D graphic model, images, video, text, and so forth) that are generated for display to appear as a part of, and/or overlaid upon, the surrounding environment. This is typically referred to as "augmented reality" or "AR." A head-wearable apparatus may additionally completely occlude a user's visual field and display a virtual environment through which a user may move or be moved. This is typically referred to as "virtual reality" or "VR." In a hybrid form, a view of the surrounding environment is captured using cameras, and then that view is displayed along with augmentation to the user on displays that occlude the user's eyes. In another form, a user device having a forward-facing camera and a rear-facing display is used to capture the surrounding environment and that view is displayed along with augmentation on the rear-facing display. As used herein, the term extended Reality (XR) refers to augmented reality, virtual reality and any of hybrids of these technologies unless the context indicates otherwise.

An XR environment allows users to interact with 2D and 3D data allowing a collaborative interactive XR experience. An XR collaboration approach can be effectively used to develop face to face interfaces and interactions with virtual elements and objects. The performance of such systems combines real and virtual worlds and performance is highly related to the alignment of user devices as they simultaneously experience the XR environment. An alignment of user devices in an XR system for shared collaborative experience aligns each user device with respect to alignment markers. This ensures the users experiences are coordinated with the position of virtual objects and with respect to each user. Alignment markers may have physical limitations, such as the use of a specific corner of room or other stationary marker. Such restraints limit XR expansion in a variety of environments.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which:

FIGS. 4A to 4E illustrate examples of gesture posing of a single hand for alignment of head-wearable apparatus for an XR session, in accordance with some examples.

DETAILED DESCRIPTION

Figure 1A:
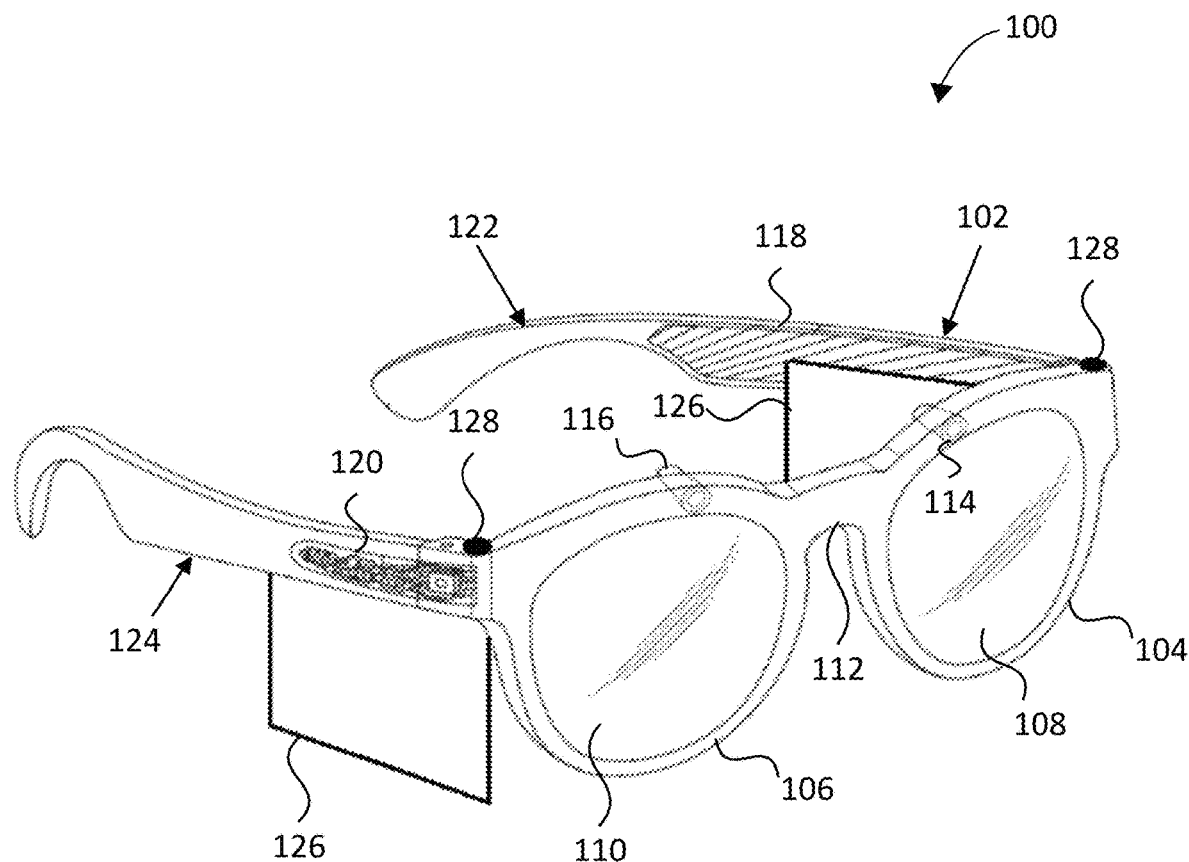
FIG. 1A is a perspective view of a head-worn device, in accordance with some examples.

XR systems comprising user devices associated with individual users have the capability to identify their position (location) and orientation in 3-D space where the position and orientation taken together constitute a pose of the user device. A pose is comprised of 6 values, 3 values for a position within a 3D Cartesian coordinate system having three orthogonal axis (a horizontal or X axis, a vertical or Y axis, and a depth or Z axis), and 3 values for a rotation around each respective axis (pitch, yaw, and roll). The 6 values are compactly referred to as the 6-D pose of the device. This may incorporate sensors and components, such as a global positioning system (GPS), an Inertial Measurement Unit (IMU), gravitometers, and the like, whose outputs are combined in a pose tracker component of a user device to track movement, sensor units, and other devices as required for an XR application. The task of determining the pose of a device from camera images, and possibly data from other sensors, is referred to as pose estimation.

In XR applications, the user device estimates its pose in a 3D reference coordinate system. The position of the body (device) is measured by the positional displacement of the body's center from the origin of the 3D reference coordinate system and the orientation is measured by the angular (rotational) displacement of the body's axes from the axes of the 3D reference coordinate system. The position is expressed by a set of points, e.g. cartesian coordinates, such as (x,y,z). The orientation is typically expressed by a set of rotation angles, e.g. the Euler angles, such as ($\alpha$, $\beta$, $\gamma$). Other parameterizations to express the rotational displacement may be used, such as quaternions or angle-axis representations. The pose may be expressed as a transformation matrix or mapping.

An XR experience provided by a user device allows a user to see a real-life environment right in front of them with a digital or virtual augmentation overlaid on it. For example, while moving down the street, the XR experience may provide an overlay of a restaurant's rating or special menu item. In other examples, virtual elements or objects are presented to a user in a game, where engagement may involve capturing an animal and so forth. An XR experience may be provided to a user by a variety of XR systems comprising user devices that may be stand alone devices or may be part of a larger network of computational devices provided computational resources and/or information used by the user device to provide an XR experience to a user. For example, a smartphone, tablet computer, or the like may provide an XR experience to a user using one or more cameras to capture a real-life environment while virtual elements are displayed to the user using a touchscreen or the like of the user device. Other user devices may include a head-wearable apparatus, such as head-wearable apparatus 100 more fully described in FIG. 1A and FIG. 1B, comprising one or more cameras that capture the real-life environment and one or more optical elements viewable by the user that are used to display virtual elements to the user. User devices may also be operatively connected to additional computing systems that provide additional computing resources to the user device. For example, a head-wearable apparatus may be operatively connected to a smartphone via wired or wireless communications link. In some examples, a user device may be operatively connected to one or more servers via a wireless communication link and a local area or wide area network. Accordingly, XR experiences may be provided to a user using a variety of user devices that may be connected to one or more additional computational devices that provide additional computational resources or information used by the user device to provide an XR experience to a user. As used herein, the terms XR system and user device are used interchangeably.

As the use of XR systems expands, there are more collaborative environments developed, where multiple users access the virtual elements in an environment. For example, ground crews at an airport wear head-wearable apparatuses in the form of XR glasses to see information about cargo containers, which provide efficiencies and speed up loading times. In some examples, interactive platforms may provide XR experiences termed "lenses" that are applied to user photos for fun and communication.

In a collaborative XR experience, multiple users may interface with XR objects through user devices with XR capability. Each user device has a specific reference coordinate system used for measurements and operations of that device. The present disclosure provides a flexible way to align user devices participating in a common XR experience provided by two or more independent user devices of an XR system by aligning coordinate systems of the user devices to a common reference coordinate system without the use of stationary alignment markers. Alignment markers are selected dynamically using somatic joints on a user's body, such as the joints of a hand. In this way, users may align their respective user devices anywhere without the use of the prior techniques that require the use of stationary alignment markers.

Specifically, each user device in a real-life environment has a specific reference coordinate system used for measurements and operations of that user device. The coordinate system of a user device is typically centered at an initial location of the user device and the movement with respect to the initial position and orientation determines the 6DoF pose of the user device. A second user device may define its position and orientation in a coordinate system centered at the initial location of the second user device. This coordinate system is typically centered at the location of the user device, where the center of a 3D position is identified as (0,0,0) and movement of the user device is measured from this origin point. Each user then has a different origin point and reference coordinate system. For alignment, a common reference coordinate system is used for the multiple user devices. Examples of aligning two users' devices are provided to facilitate the description and the present disclosure can be applied to align user devices of any number of users.

A common reference coordinate system is used for a shared XR experience, where the individual user devices are aligned to the common reference coordinate system. In the examples provided herein, somatic points are used as alignment markers to align user devices in an XR system to a common reference coordinate system. Somatic points of the present examples are the joints and/or connectors of a hand; other somatic points may be used depending on the application.

As mentioned, XR systems often use precise alignment of virtual objects to a real environment. For shared collaboration of users in an XR system, the users align their respective user devices using a common reference coordinate system, also referred to herein as a Coordinate System (CS). As the use of XR applications expand it is desirable to enable alignment of user devices independently of a specific environment or location, adding flexibility to such systems.

In some examples, a user's hand provides an alignment marker, where each user device captures an image of the hand, identifies somatic points through object recognition, and measures the position of the somatic points of the hand in its own coordinate system. For alignment, the user devices determine a common reference coordinate system wherein one or more user devices map objects in their coordinate system to the common reference coordinate system. A first user has a first user device to capture an image of the hand from the perspective of first user device and a second user has a second user device to capture an image of the hand from the perspective of the second user device. Each user device performs object recognition to identify somatic points on the hand, such as joints, for use as alignment markers. The first user device determines the position of each somatic point, or joint, as measured in its coordinate system (CS1). The second user device determines the position of each somatic point, or joint, as measured in its own coordinate system (CS2). The first user device shares the position information measured in CS1 with the second user device. The second user device then maps the positions of alignment markers in CS2 to CS1, thus using CS1 as the common reference coordinate system. Once the mapping is completed, movement of the second user device, and therefore movement of the second user is described in CS1.

A shared XR experience may involve user devices such as glasses, mobile devices (e.g., smart phones, tablets,) or other types of user devices. The user devices are aligned to use the same coordinate system, or Common Reference Coordinate System (CRCS). The CRCS may be the CS of one of the user devices or may be defined otherwise, where the one or more user devices align to an independent CRCS. In some examples, the user devices align to a common reference coordinate system by determining a relationship between the individual coordinate systems.

The use of somatic points allows the users engage in a common XR session and to align the user devices in any location and condition without predefined alignment markers. The somatic points defined herein are hands and joints, however, any dynamic markers may be used where multiple users are able to map to a CRCS.

In some examples, a hand of one user is used as an alignment object having a set of alignment markers, where each user device identifies somatic points on the hand and measures the somatic points viewed at a same point in time. The hand is used as an alignment object to align the two coordinate systems, where both user devices are describing the environment according to a CRCS.

Once the user devices are aligned to a CRCS, movement and other measurements are performed within the CRCS., Each user device's tracking measurements are made in the CRCS such that each user device is describing their location and movement in the CRCS. This way all measurements are made in the CRCS and the users are aligned with each other as well as with respect to the XR objects presented in the real-life environment. The CRCS is applied to user tracking, such as for 6 degrees of freedom (6DoF) pose tracking. The pose tracking components of each user's device works independently of other calculations, components, applications and devices, while describing motion of a user in the CRCS. In this way, the CRCS is established as a reference coordinate system and is used for various purposes within a user device.

The use of alignment markers based on somatic points expands application of XR systems to a variety of areas and environments as alignment markers presented herein are dynamic and agnostic to location. They are not stationary pre-defined markers, but rather use information from each of the users in such a system to determine a relationship between users and apply a CRCS.

For alignment, the user devices employ cameras to capture an image or images of a hand and use object recognition components to identify somatic points on the images as alignment markers. The process uses the somatic points to align the user devices to a CRCS. A user pose definition is expressed in the CRCS, which may be the coordinate system of one user or may be an independent coordinate system. The user devices may be head-wearable apparatuses having capability to engage in an XR session.

Other technical features may be readily apparent to one skilled in the art from the following figures, descriptions, and claims.

FIG. 1A is a perspective view of a head-wearable apparatus 100 in accordance with some examples. The head-wearable apparatus 100 may be a client or user device of an XR system, such as computing system 902 of FIG. 9. The head-wearable apparatus 100 can include a frame 102 made from any suitable material such as plastic or metal, including any suitable shape memory alloy. In one or more examples, the frame 102 includes a first or left optical element holder 104 (e.g., a display or lens holder) and a second or right optical element holder 106 connected by a bridge 112. A first or left optical element 108 and a second or right optical element 110 can be provided within respective left optical element holder 104 and right optical element holder 106. The right optical element 110 and the left optical element 108 can be a lens, a display, a display assembly, or a combination of the foregoing. Any suitable display assembly can be provided in the head-wearable apparatus 100.

The frame 102 additionally includes a left arm or left temple piece 122 and a right arm or right temple piece 124. In some examples the frame 102 can be formed from a single piece of material so as to have a unitary or integral construction.

The head-wearable apparatus 100 may include a computing device, such as a computer 120, which can be of any suitable type so as to be carried by the frame 102 and, in one or more examples, of a suitable size and shape, so as to be partially disposed in one of the left temple piece 122 or the right temple piece 124. The computer 120 can include one or more processors with memory, wireless communication circuitry, and a power source. As discussed below, the computer 120 comprises low-power circuitry, high-speed circuitry, and a display processor. Various other examples may include these elements in different configurations or integrated together in different ways. Additional details of aspects of the computer 120 may be implemented as illustrated by the machine 200 discussed herein.

The computer 120 additionally includes a battery 118 or other suitable portable power supply. In some examples, the battery 118 is disposed in left temple piece 122 and is electrically coupled to the computer 120 disposed in the right temple piece 124. The head-wearable apparatus 100 can include a connector or port (not shown) suitable for charging the battery 118, a wireless receiver, transmitter or transceiver (not shown), or a combination of such devices.

The head-wearable apparatus 100 includes a first or left camera 114 and a second or right camera 116. Although two cameras are depicted, other examples contemplate the use of a single or additional (i.e., more than two) cameras. In some examples, the head-wearable apparatus 100 includes any number of input sensors or other input/output devices in addition to the left camera 114 and the right camera 116. Such sensors or input/output devices can additionally include biometric sensors, location sensors, motion sensors, and so forth. In some examples, the motion sensors include acceleration sensor components (e.g., accelerometers), gravitation sensor components, rotation sensor components (e.g., gyroscopes), and the like. In some examples, the motion sensors may be incorporated in an Inertial Motion Unit (IMU) or the like.

In some examples, the left camera 114 and the right camera 116 provide tracking video frame data for use by the head-wearable apparatus 100 to extract 3D information from a real-life environment.

The head-wearable apparatus 100 may also include a touchpad 126 mounted to or integrated with one or both of the left temple piece 122 and right temple piece 124. The touchpad 126 is generally vertically-arranged, approximately parallel to a user's temple in some examples. As used herein, generally vertically aligned means that the touchpad is more vertical than horizontal, although potentially more vertical than that. Additional user input may be provided by one or more buttons 128, which in the illustrated examples are provided on the outer upper edges of the left optical element holder 104 and right optical element holder 106.

The one or more touchpads 126 and buttons 128 provide a means whereby the head-wearable apparatus 100 can receive input from a user of the head-wearable apparatus 100.

Figure 1B:
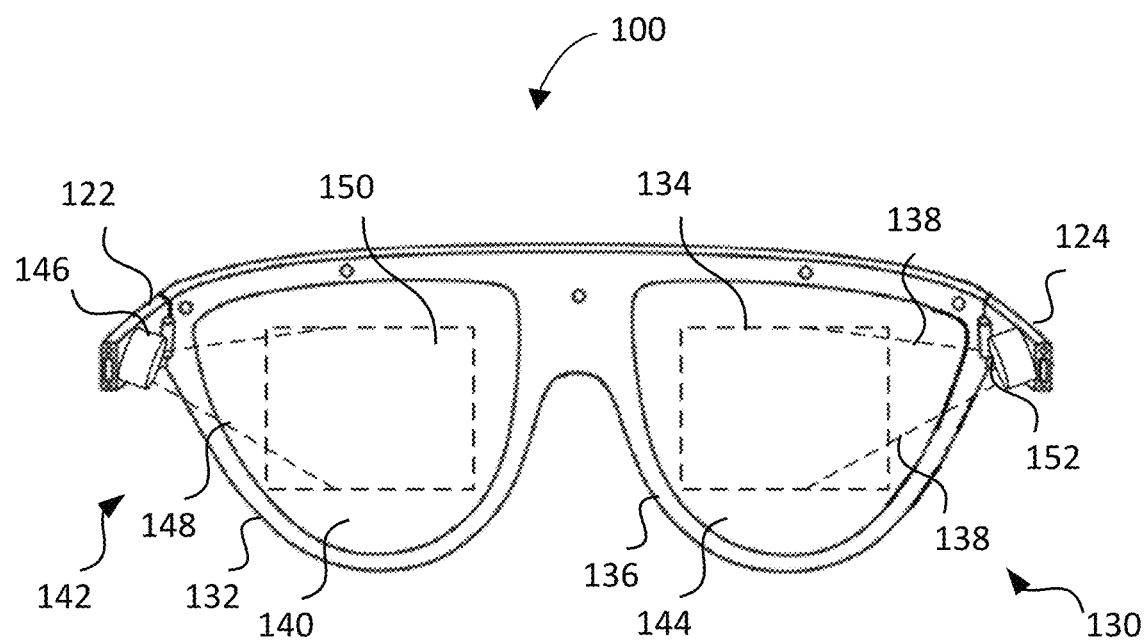
FIG. 1B illustrates a further view of the head-worn device of FIG. 1A, in accordance with some examples.

FIG. 1B illustrates the head-wearable apparatus 100 from the perspective of a user while wearing the head-wearable apparatus 100. For clarity, a number of the elements shown in FIG. 1A have been omitted. As described in FIG. 1A, the head-wearable apparatus 100 shown in FIG. 1B includes left optical element 140 and right optical element 144 secured within the left optical element holder 132 and the right optical element holder 136 respectively.

The head-wearable apparatus 100 includes right forward optical assembly 130 comprising a left near eye display 150, a right near eye display 134, and a left forward optical assembly 142 including a left projector 146 and a right projector 152.

In some examples, the near eye displays are waveguides. The waveguides include reflective or diffractive structures (e.g., gratings and/or optical elements such as mirrors, lenses, or prisms). Light 138 emitted by the right projector 152 encounters the diffractive structures of the waveguide of the right near eye display 134, which directs the light towards the right eye of a user to provide an image on or in the right optical element 144 that overlays the view of the real-life environment of the user. Similarly, light 148 emitted by the left projector 146 encounters the diffractive structures of the waveguide of the left near eye display 150, which directs the light towards the left eye of a user to provide an image on or in the left optical element 140 that overlays the view of the real-life environment seen by the user. The combination of a Graphical Processing Unit, an image display driver, the right forward optical assembly 130, the left forward optical assembly 142, left optical element 140, and the right optical element 144 provide an optical engine of the head-wearable apparatus 100. The head-wearable apparatus 100 uses the optical engine to generate an overlay of the real-life environment view of the user including display of a user interface to the user of the head-wearable apparatus 100.

It will be appreciated however that other display technologies or configurations may be utilized within an optical engine to display an image to a user in the user's field of view. For example, instead of a projector and a waveguide, an LCD, LED or other display panel or surface may be provided.

In use, a user of the head-wearable apparatus 100 will be presented with information, content and various user interfaces on the near eye displays. As described in more detail herein, the user can then interact with the head-wearable apparatus 100 using a touchpad 126 and/or the button 128, voice inputs or touch inputs on an associated device (e.g. mobile device 814 illustrated in FIG. 8), and/or hand movements, locations, and positions recognized by the head-wearable apparatus 100.

In some examples, an optical engine of an XR system is incorporated into a lens that is contact with a user's eye, such as a contact lens or the like. The XR system generates images of an XR experience using the contact lens.

In some examples, the head-wearable apparatus 100 comprises an XR system. In some examples, the head-wearable apparatus 100 is a component of an XR system including additional computational components. In some examples, the head-wearable apparatus 100 is a component in an XR system comprising additional user input systems or devices.

Machine Architecture

Figure 2:
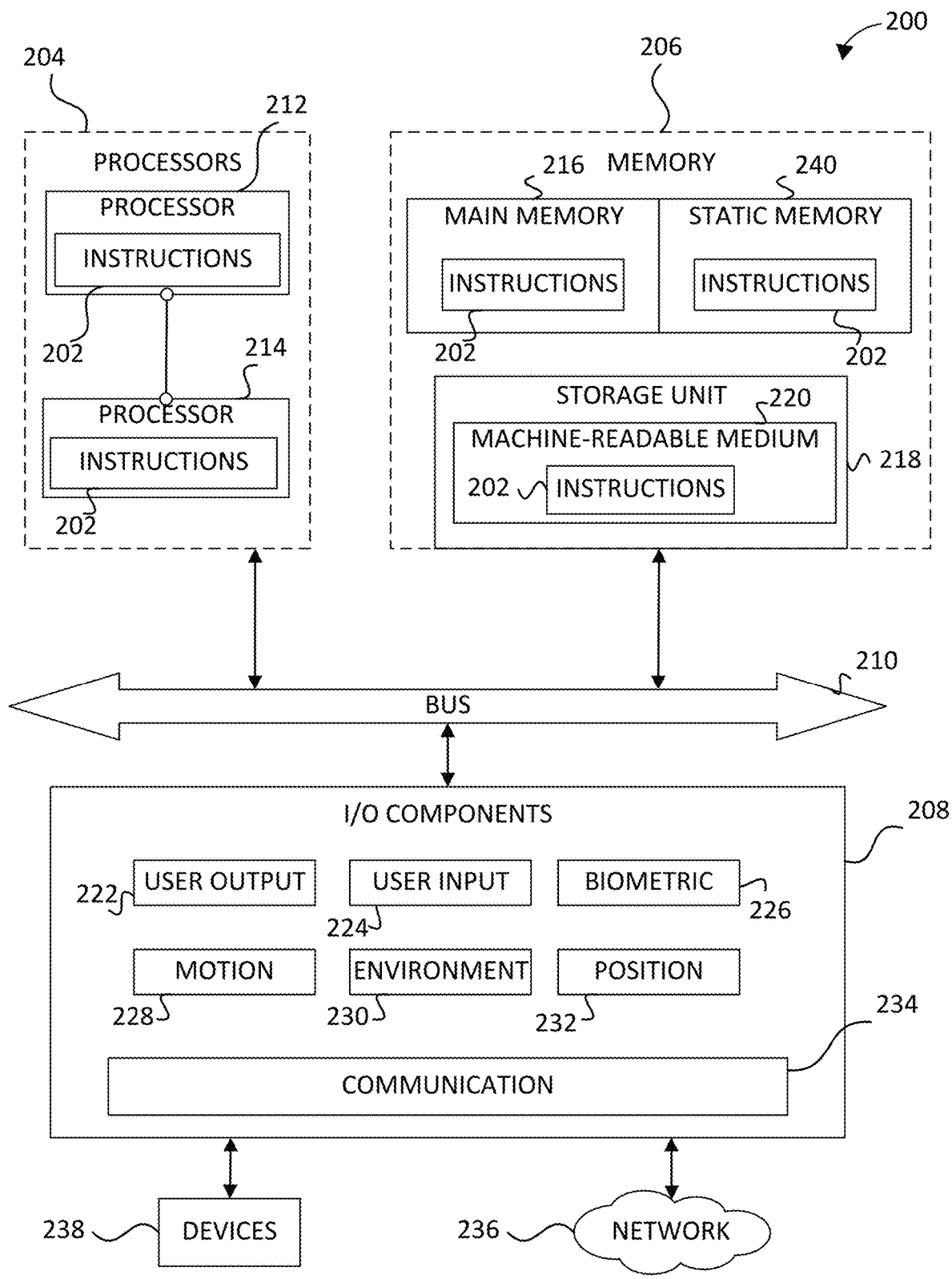
FIG. 2 is a diagrammatic representation of a machine in the form of a computer system within which a set of instructions may be executed to cause the machine to perform any one or more of the methodologies discussed herein, in accordance with some examples.

FIG. 2 is a diagrammatic representation of the machine 200 within which instructions 202 (e.g., software, a program, an application, an applet, an app, or other executable code) for causing the machine 200 to perform any one or more of the methodologies discussed herein may be executed. For example, the instructions 202 may cause the machine 200 to execute any one or more of the methods described herein. The instructions 202 transform the general, non-programmed machine 200 into a particular machine 200 programmed to carry out the described and illustrated functions in the manner described. The machine 200 may operate as a standalone device or may be coupled (e.g., networked) to other machines. In a networked deployment, the machine 200 may operate in the capacity of a server machine or a client machine in a server-client network environment, or as a peer machine in a peer-to-peer (or distributed) network environment. The machine 200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 202, sequentially or otherwise, that specify actions to be taken by the machine 200. Further, while a single machine 200 is illustrated, the term "machine" shall also be taken to include a collection of machines that individually or jointly execute the instructions 202 to perform any one or more of the methodologies discussed herein. The machine 200, for example, may comprise the computing system 902 or any one of multiple server devices forming part of the interaction server system 910. In some examples, the machine 200 may also comprise both client and server systems, with certain operations of a particular method or algorithm being performed on the server-side and with certain operations of the particular method or algorithm being performed on the client-side.

The machine 200 may include processors 204, memory 206, and input/output I/O components 208, which may be configured to communicate with each other via a bus 210. In an example, the processors 204 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 212 and a processor 214 that execute the instructions 202. The term "processor" is intended to include multi-core processors that may comprise two or more independent processors (sometimes referred to as "cores") that may execute instructions contemporaneously. Although FIG. 2 shows multiple processors 204, the machine 200 may include a single processor with a single-core, a single processor with multiple cores (e.g., a multi-core processor), multiple processors with a single core, multiple processors with multiples cores, or any combination thereof.

The memory 206 includes a main memory 216, a static memory 240, and a storage unit 218, both accessible to the processors 204 via the bus 210. The main memory 206, the static memory 240, and storage unit 218 store the instructions 202 embodying any one or more of the methodologies or functions described herein. The instructions 202 may also reside, completely or partially, within the main memory 216, within the static memory 240, within machine-readable medium 220 within the storage unit 218, within at least one of the processors 204 (e.g., within the processor's cache memory), or any suitable combination thereof, during execution thereof by the machine 200.

The I/O components 208 may include a wide variety of components to receive input, provide output, produce output, transmit information, exchange information, capture measurements, and so on. The specific I/O components 208 that are included in a particular machine will depend on the type of machine. For example, portable machines such as mobile phones may include a touch input device or other such input mechanisms, while a headless server machine will likely not include such a touch input device. It will be appreciated that the I/O components 208 may include many other components that are not shown in FIG. 2. In various examples, the I/O components 208 may include user output components 222 and user input components 224. The user output components 222 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 224 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 208 may include biometric components 226, motion components 228, environmental components 230, or position components 232, among a wide array of other components. For example, the biometric components 226 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 228 include acceleration sensor components (e.g., accelerometer), gravitation sensor components, rotation sensor components (e.g., gyroscope).

The environmental components 230 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), depth or distance sensors (e.g., sensors to determine a distance to an object or a depth in a 3D coordinate system of features of an object), or other components that may provide indications, measurements, or signals corresponding to a surrounding physical environment.

Figure 9:
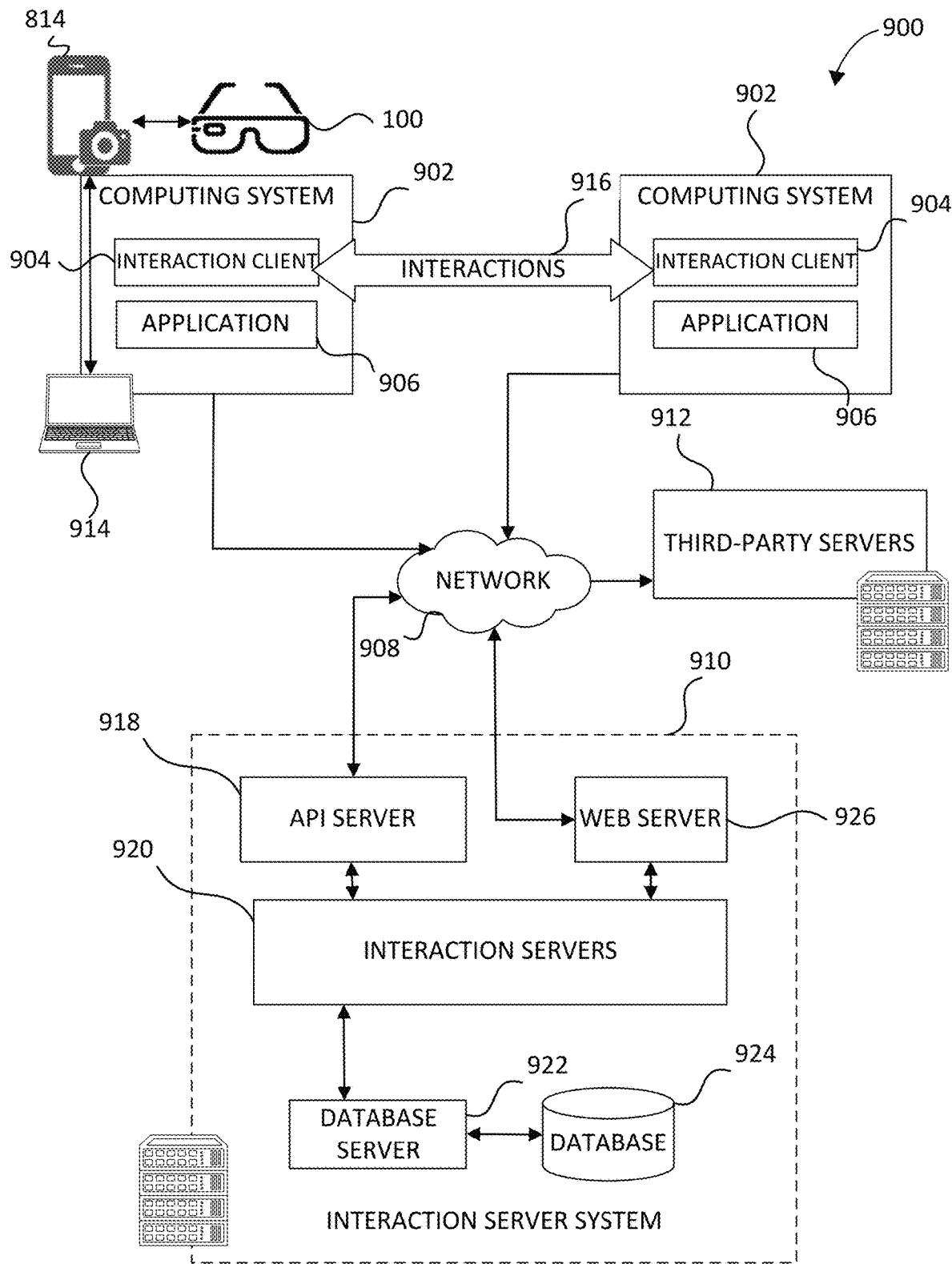
FIG. 9 is a diagrammatic representation of a networked environment in which the present disclosure may be deployed, in accordance with some examples.

With respect to cameras, FIG. 9 illustrates a computing system 902 in which the camera system is included and includes, for example front cameras on a front surface of the computing system 902 and rear cameras on a rear surface of the computing system 902. The front cameras may, for example, be used to capture still images and video of a user of the computing system 902 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the computing system 902 may also include a 360° C.amera for capturing 360° photographs and videos.

Further, the camera system of the computing system 902 may include dual rear cameras (e.g., a primary camera as well as a depth-sensing camera), or even triple, quad or penta rear camera configurations on the front and rear sides of the computing system 902. These multiple cameras systems may include a wide camera, an ultra-wide camera, a telephoto camera, a macro camera, and a depth sensor, for example.

Returning to FIG. 2, the position components 232 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 208 further include communication components 234 operable to couple the machine 200 to a network 236 or devices 238 via respective coupling or connections. For example, the communication components 234 may include a network interface component or another suitable device to interface with the network 236. In further examples, the communication components 234 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 238 may be another machine or any of a wide variety of peripheral devices (e.g., a peripheral device coupled via a USB).

Moreover, the communication components 234 may detect identifiers or include components operable to detect identifiers. For example, the communication components 234 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 234, such as location via Internet Protocol (IP) geolocation, location via Wi-Fi® signal triangulation, location via detecting an NFC beacon signal that may indicate a particular location, and so forth.

The various memories (e.g., main memory 216, static memory 240, and memory of the processors 204) and storage unit 218 may store one or more sets of instructions and data structures (e.g., software) embodying or used by any one or more of the methodologies or functions described herein. These instructions (e.g., the instructions 202), when executed by processors 204, cause various operations to implement the disclosed examples.

The instructions 202 may be transmitted or received over the network 236, using a transmission medium, via a network interface device (e.g., a network interface component included in the communication components 234) and using any one of several well-known transfer protocols (e.g., hypertext transfer protocol (HTTP)). Similarly, the instructions 202 may be transmitted or received using a transmission medium via a coupling (e.g., a peer-to-peer coupling) to the devices 238.

Figure 3:
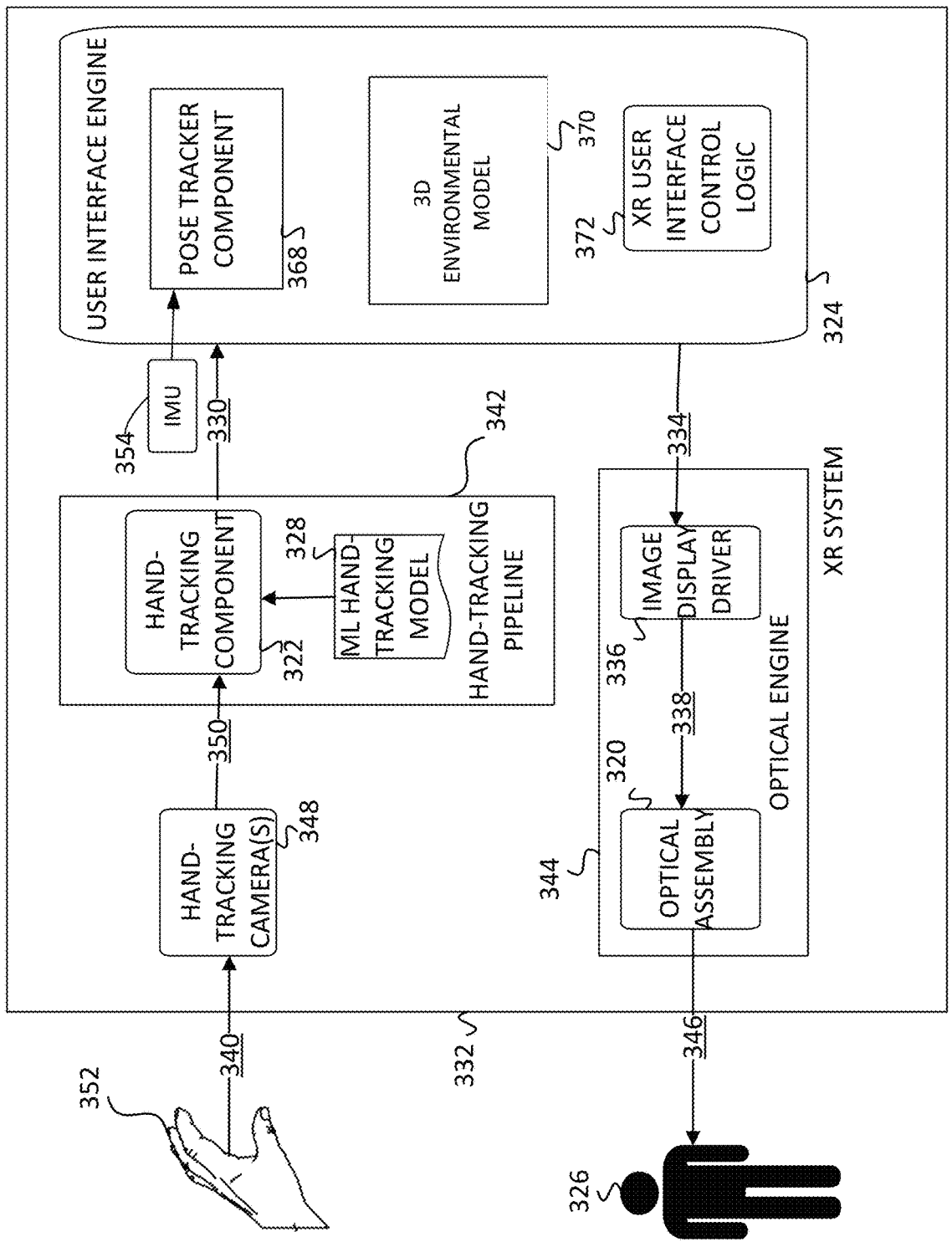
FIG. 3 illustrates a collaboration diagram of components of an XR system using hand-tracking for user input, in accordance with some examples.

FIG. 3 illustrates a collaboration diagram of components of an XR system using hand-tracking for user input. Method of scaling virtual objects are used by an XR system, such as head-wearable apparatus 100 (of FIG. 1A), to provide a continuous real-time input modality to a user of the XR system where the user interacts with an XR user interface using hand gestures or hand poses. The XR application may be a useful application such as an interactive game, maintenance guide, an interactive map, an interactive tour guide, a tutorial, or the like. The XR application may also be an entertainment application such as a video game, an interactive video, or the like.

The XR system 332 generates the XR user interface 346 provided to a user 326. For example, a user interface engine 324 includes XR user interface control logic 372 comprising a dialog script or the like that specifies a user interface dialog implemented by the XR user interface 346. The XR user interface control logic 372 also comprises one or more actions that are to be taken by the XR system based on detecting various dialog events such as user inputs. The user interface engine 324 further includes an XR user interface object model 370. The XR user interface object model 370 includes 3D coordinate data of one or more virtual objects and 3D coordinate data of one or more colliders associated with a virtual object. The XR user interface object model 370 also includes 3D graphics data of a virtual object. The 3D graphics data is used by an optical engine 344 to generate the XR user interface 346 for display to the user 326.

The user interface engine 324 generates XR user interface graphics data 334 based on the XR user interface object model 370. The XR user interface graphics data 334 includes image video data of the one or more virtual objects of the XR user interface 346. The user interface engine 324 communicates the XR user interface graphics data 334 to an image display driver 336 of an optical engine 344 of the XR system 332. The image display driver 336 receives the XR user interface graphics data 334 and generates display control signals 338 based on the XR user interface graphics data 334. The image display driver 336 uses the display control signals 338 to control the operations of one or more optical assemblies 320 of the optical engine 344. In response to the display control signals 338, the one or more optical assemblies 320 generate visible images of the XR user interface 346 that are provided to the user 326.

The XR system 332 detects hand poses or gestures made by the user 326. For example, the XR system 332 uses one or more hand-tracking cameras 348 to capture tracking video frame data 350 of hand poses 340 or gestures being made by the user 326 using one or more of the user's hands 352. The hand-tracking cameras 348 communicate the tracking video frame data 350 to a hand-tracking component 322 of a hand-tracking pipeline 342 of the XR system 332.

The hand-tracking component 322 receives the tracking video frame data 350 and generates hand-tracking data 330 based on the tracking video frame data 350. The hand-tracking data 330 comprises skeletal model data of one or more skeletal models of the one or more hands 352 of the user in a 3D coordinate system based on the landmark features extracted from the tracking video frame data 350, and hand pose categorization data of a hand pose 340 or gesture being made by the user's one or more hands 352. The skeletal models comprise skeletal model features that correspond to recognized visual landmarks of portions of the one or more hands 352 of the user 326. In some examples, the hand-tracking data 330 includes landmark data such as landmark identification, a physical location of the landmark, links between joints of the user's fingers and categorization information of one or more landmarks associated with the one or more hands 352 of the user 326. In some examples, the hand pose categorization data includes an indication of a hand pose or gesture being made by one or more of the hands 352 of the user 326.

For example, the hand-tracking component 322 may recognize landmark features on portions of the one or more hands 352 of the user 326 captured in the tracking video frame data 350. In some examples, the hand-tracking component 322 extracts landmarks of the one or more hands 352 of the user 326 from the tracking video frame data 350 using computer vision methodologies including, but not limited to, Harris corner detection, Shi-Tomasi corner detection, Scale-Invariant Feature Transform (SIFT), Speeded-Up Robust Features (SURF), Features from Accelerated Segment Test (FAST), Oriented FAST and Rotated BRIEF (ORB), and the like.

In some examples, the hand-tracking component 322 generates the hand pose categorization data and the sequence of skeletal models of hand-tracking data 330 based on the landmarks extracted from the tracking video frame data 350 using artificial intelligence methodologies and an ML hand-tracking model 328 that was previously generated using machine learning methodologies. In some examples, an ML hand-tracking model 328 comprises, but is not limited to, a neural network, a learning vector quantization network, a logistic regression model, a support vector machine, a random decision forest, a naïve Bayes model, a linear discriminant analysis model, and a K-nearest neighbor model. In some examples, machine learning methodologies used to generate the ML hand-tracking model 328 may include, but are not limited to, supervised learning, unsupervised learning, semi-supervised learning, reinforcement learning, dimensionality reduction, self-learning, feature learning, sparse dictionary learning, and anomaly detection.

In some examples, the hand-tracking component 322 generates the hand pose categorization data and the sequence of skeletal models of the hand-tracking data 330 based on the landmarks extracted from the tracking video frame data 350 using geometric methodologies.

In some examples, the XR system 332 comprises an IMU 354 that generates 6DoF data of a pose of the head-wearable apparatus 100. A pose tracker component 368 uses the 6DoF data of the IMU 354 to determine a pose in a real-life environment based on a reference frame of the 3D environmental model 370. In addition, the 3D environmental model 370 includes 3D position data of physical objects and one or more users wearing head-wearable apparatuses, such as head-wearable apparatus 100, within a physical environment of a real-life environment.

Alignment of User Devices Using Somatic Points

An XR session involves presentation of XR data through one or more user devices in a physical area. The user device may be a head-wearable apparatus as shown in FIG. 1A. In some examples, when multiple users are participating in an XR session the goal is for users to experience the XR objects in a shared collaborative way to interact and experience virtual objects in the same way. In such a session, alignment of the user devices provides a similar experience to each user and allows collaboration in the XR environment. The present methods enable alignment of user devices by determining a relative pose (3D position and 3D orientation) of the reference coordinate systems of the 6DoF-pose trackers of two or more user devices. Each user device identifies its position, or location, in a physical area by measuring its position in its a reference frame. For alignment, somatic points are identified in each CS, and then mapped or translated to a CRCS, such as the CS of one user. In this way, once aligned, movements, position, orientation, translation and other measures are made for each user device and its respective user in a common reference coordinate system.

User device movement, location and other measures are defined in the CRCS, such as the CS of the first user device, where other user devices in the XR system, such as the second user device, align with that CRCS by translating their 3D position.

In some examples, a common reference coordinate system is defined other than those of the first and second user devices, where each of the first and second user devices translate their data sets to the common reference coordinate system. This may be used where multiple user devices are aligning in shared collaborative application.

Figure 5A:
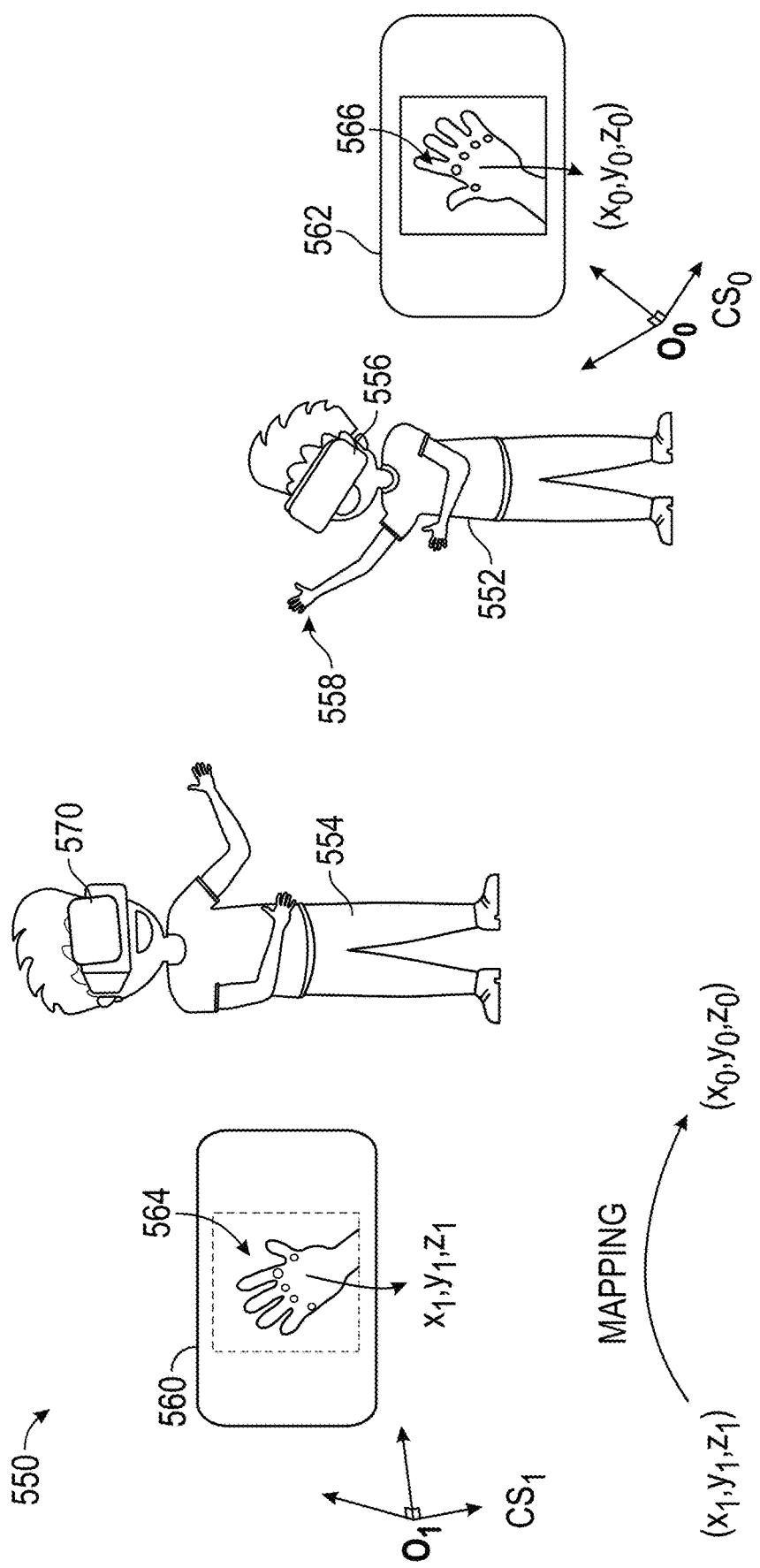
FIG. 5A illustrates alignment of two user devices with somatic alignment marker of a single raised hand visible to both users, in accordance with some examples.

The position information may be defined by a location vector representing a center point of a user device as reference origin, O, such as illustrated in FIG. 5A. The position vector having the origin location of $P_O=(0,0,0)$. The user device tracks the displacement or translation of the position vector. The orientation information may be defined by an angular position vector with respect to the origin, where the origin angular position is $A_O=(0,0,0)$ corresponding to the angular movements of an object. Positional and movement measurements are made with respect to this origin and directional definitions.

Once aligned, user devices identify their location in the physical area by measuring position and orientation in the CRCS, such as to measure a set of 6DoF values, referred to as a 6DoF pose, using an IMU of the user device. As each user device has an individual coordinate system, one or more of the user devices calculate respective corrections of their location using the CRCS in real-time. The estimation of the relative difference of position values between an individual coordinate system and the CRCS provides a relationship between user devices for user device alignment.

Consider two users, a first user and a second user, where alignment involves estimation of the relative position of a first user device of the first user with respect to a second user device of the second user. The first user device calculates pose information in its coordinate system. The first user provides their hand at a position and orientation. The camera of the first user device captures an image of the hand. Using object recognition, the first user device identifies somatic points on the hand and applies the identified somatic points as alignment markers in the first user device's coordinate system (CS1). The CS1 of the first user device is selected as the common reference coordinate system. User device 1 transmits the pose information to the second user device for alignment, which receives the position and orientation information in the common reference coordinate system. The second user device also captures an image of the hand and uses object recognition to identify the same somatic points as the first user device did, but from a different perspective. While the second user device uses the coordinate system of the second user device, or CS2, to identify position and orientation of the somatic points, the second user device then applies the first user device values in the CS1 for translation of the second user device values to the common reference coordinate system. At this point, both user devices are defining their individual position and orientation within the XR environment and with respect to each other and the XR objects in the common reference coordinate system. This process aligns the user devices as each understands the location of XR objects consistently.

The alignment markers comprise somatic information, such as somatic points within a user's hand or hands, to estimate relative position and orientation or pose, of two user devices, providing a dynamic alignment method that may be performed between user devices in a variety of situations. These types of alignment markers allow the user devices in an XR system to align in reference to each other without the use of stationary objects. This may be considered user-relative alignment and may extend to multiple users, however, for clarity of understanding two users are described, a first user and a second user, each having a respective user device, such as a head-wearable apparatus with camera and XR capabilities of FIG. 1A.

FIGS. 4A and 4B illustrate a palm view image 400 of a hand captured by a first user device using a camera of the first user device and a backhand view image 420 of the hand by captured by a second user device using a camera of the second user device. The images are captured at approximately the same time while the hand is in one position. The camera of the first user device captures the palm view image 400 of the palm of the hand as illustrated in FIG. 4A. The camera of the second user device captures the backhand view image 420 of the back of the hand as illustrated in FIG. 4B. The palm view image 400 and the back view image 420 are captured at approximately the same time so that the location of somatic points in the images correspond in time and position, but each user device measures the somatic points from their respective perspectives.

The first user device uses object recognition to identify a joint location 402 at the base of the thumb, and joint locations 404, 406, 408 and 410 at the base of fingers. The second user device also uses object recognition to identify the joint location 422 at the base of the thumb, and joint locations 424, 426, 428 and 430 at the base of fingers. The joint locations of image 400 correspond to the joint locations of image 420. The identified joints are somatic points used as alignment markers and the estimated difference between position values of the joints measured in a first coordinate system (CS1) of the first user device and position values of the joints measured in a second coordinate system (CS2) of the second user device. The first user device generates a reference data set based on the position information of the somatic points in CS1 being used as alignment markers and shares reference data set with the second user device. The position of the somatic points from the first user device in CS1 are compared to their measured position values in CS2 of the second user device. The second user device calculates a mapping or translation of position values of the somatic points from CS2 to CS1. Accordingly, the second user device aligns itself to the first user device by using CS1 of the first user device as the CRCS and the difference is the estimated relative position between the first user device and the second user device.

FIG. 4E is a process flow diagram 460 of an alignment process in accordance with some examples. Two or more user devices use the alignment process to align themselves based on a common reference coordinate system or CRCS.

In operation 462, a user of a first user device positions a hand such that the hand is perceivable by the first user device and a second user device of a second user. In some examples, the hand is held in a defined position or pose. In some examples, the first user positions both of their hands so that they are perceivable by the first device and the second device.

In operation 464, the first user device and the second user device capture a set of images of the hand. For example, the first device captures a set of images of the hand from a first perspective, and the second device captures a set of images from a second perspective. In some examples, the first set of images and the second set of images include time stamps identifying a time at which each image of a set of images is captured.

In operation 466, the first user device and the second user device perform object recognition to identify somatic points on the hand that are used as alignment markers. For example, in reference to FIG. 4A, and FIG. 4B, object recognition is used to identify joint location 402 at the base of the thumb, and joint locations 404, 406, 408 and 410 at the base of fingers. The second user device also uses object recognition to identify the joint location 422 at the base of the thumb, and joint locations 424, 426, 428 and 430 at the base of fingers.

In operation 468, the first user device and the second device determine position information of the somatic points based on the object recognition. For example, first user device determines the somatic point location information in the CS1 of the first user device, and the second user device determines the location information of the somatic points in the CS2 of the second user device.

In operation 470, the user devices select a CRCS determine which user device's CS, either CS1 of the first user device or CS2 of the second user device, is to be used as the CRCS. For example, when each user device enters the XR session, the user device records a timestamp and the CS of the user device with the oldest timestamp for the XR system is used as the CRCS. In some examples, the CS1 of the first user device is selected as the CRCS. In some examples, the CS2 of the second user device is selected as the CRCS.

In response to determining that the CS1 of the first device is to be used as the CRCS, the first user device generates a reference data set based on the location information of the somatic points. For example, the first user device generates the reference data set based on the 6DoF location and orientation (pose) information of the somatic points in the CS1. In some examples, the first user device also generates a time stamp for the reference data set based on a time at which the image data from which the somatic points were extracted, was captured.

In operation 472, the first user device transmits the reference data set to the second user device. For example, the first user device transmits the reference data set to the second user device via a point to point communication protocol such as Bluetooth. In some examples, the user devices communicate using a wireless network such as a wireless Local Area Network (LAN) or a wireless Wide Area Network (WAP). In some examples, the user devices are in an XR session that is being coordinated by a remote server and the user devices communicate with each other via the remote server.

In operation 474, the second user device receives the reference data set and the second user device aligns itself to the first user device based on the reference data set. For example, the second user device uses the reference data set having the location information of the somatic points of the hand in the CS1 of the first device, and the location information of the somatic points in the CS2 of the second user device to create a transformation matrix that transforms locations in the CS2 into locations in the CS1. In subsequent operations, the second user device applies the transformation matrix to subsequent 6DoF data received from the second device's IMU to calculate the location and orientation (pose) of the second user device, and thus the second user. In some examples, the second user device resets an origin point of the CS2 of the second device based on the reference data set. Accordingly, subsequent 6DoF received from the IMU of the second user device are referenced to the reset origin of the CS2.

In response to determining that the CS2 of the second device is to be used as the CRCS in operation 470, operations 472 and 474 are performed with the roles of the first user device and the second user device being reversed, that is the CRCS is based on the CS2 of the second device and the first user device aligns itself to the second user device using a reference data set generated by the second user device.

In reference to FIG. 4C and FIG. 4D, the first and second user devices may use object recognition to recognize segments of the hand, or connectors between joints, such as segments 442, 444, 446 as illustrated on the palm view 440 of the hand, corresponding to segments 452, 454, 456 as illustrated on the back view 450 of the hand, as somatic points used as alignment markers as described herein.

FIG. 5A illustrates an XR environment in which multiple users are collaborating. Each user has an XR device for viewing the environment and XR elements or objects. User 552 with user device 556 and user 554 with user device 570 are facing each other. User 552 raises a hand 558 for alignment of user device 556 and user device 570; the hand 558 is visible to both users. Each user device captures an image of the hand from their perspective, where user device 556 captures an image of the palm and user device 570 captures an image of the back of the hand 558. Image 562 is from user device 556 and image 560 is from user device 570. Object recognition determines the locations of joints 566 in $CS_0$ of user device 556 with origin $O_0$ identified as $(x_1,y_0,z_0)$, where each joint has a specific measured 3D location. For user device 570, object recognition determines the locations of joints 564 in CS1 of user device 570 with origin $O_1$ identified as $(x_1,y_1,z_1)$. Alignment of user device 570 and user device 556 involves adopting $CS_0$ as a CRCS of the XR environment and mapping of locations and measurements in $CS_1$ (of user device 570) to $CS_0$ (of user device 556). Measurements of poses of each user device 570 and 556 are now made in the CRCS and users may collaborate in the XR environment.

There are a variety of ways for the user devices to identify the location of the somatic points used as alignment markers. Using machine learning (ML), a model takes the captured image and identifies the 3D location, points and boundaries of the joints as the somatic points to use as alignment markers. Other features may be used as somatic points used as alignment markers, where ML is designed to identify or infer other features. In some examples, in a user device with stereo camera capability, the user device may capture two images of the user's hand at the same time resulting in images from different viewpoints. The user device may match the corresponding 2D joint locations and use a stereo baseline for triangulation to find the position of the joints of the hand used as somatic points in 3D. In examples when the user device includes a depth sensor, the user device detects the hand joints in the image and receives the 3D information from the depth image. In each of these methods, the user device creates position data for the somatic points in its CS, which may be stored in memory as a point-cloud. An alignment process then aligns the somatic point position information of one user device to a CRCS, which may be through point-cloud alignment or mapping of points from one point-cloud to another. This use of the stereo images and multiple views of the hand allow stereo matching for accurate identification and reconstructed such as by triangulation techniques.

Figure 5B:
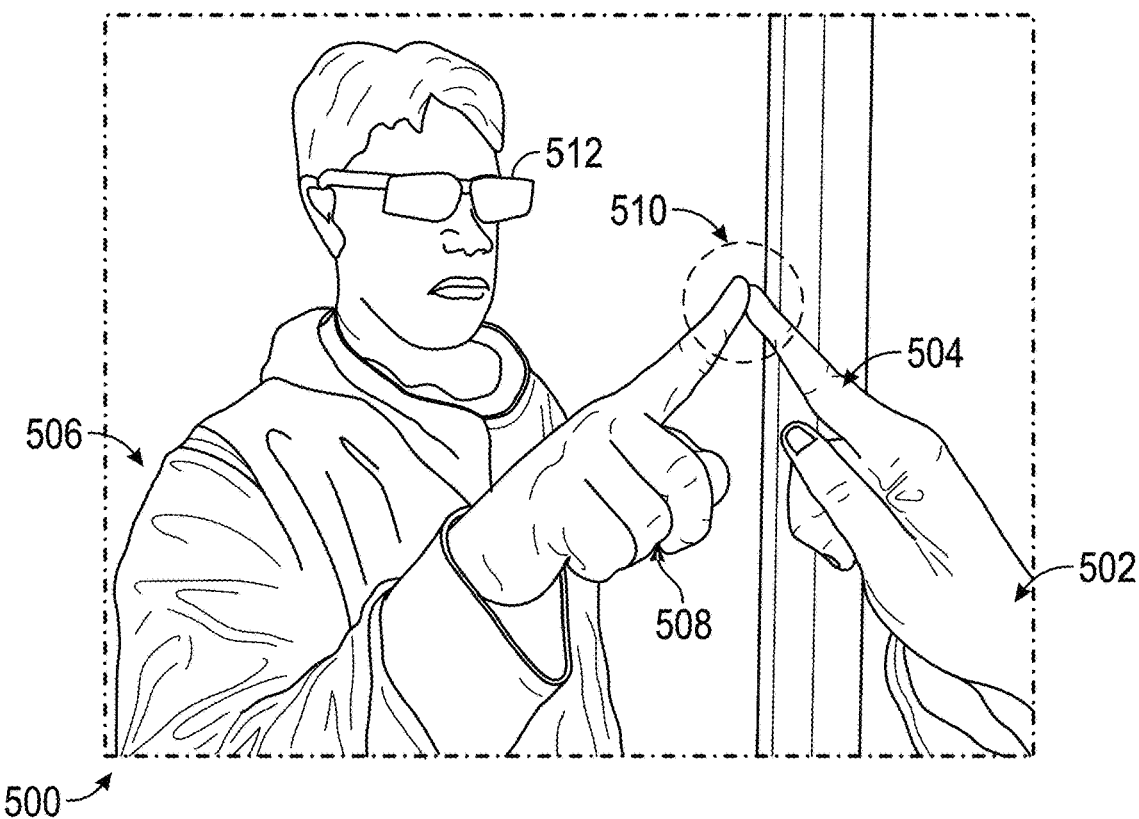
FIGS. 5B and 5C illustrate alignment of two user devices with a somatic alignment marker of two interacting hands visible to both users, in accordance with some examples.
Figure 5C:
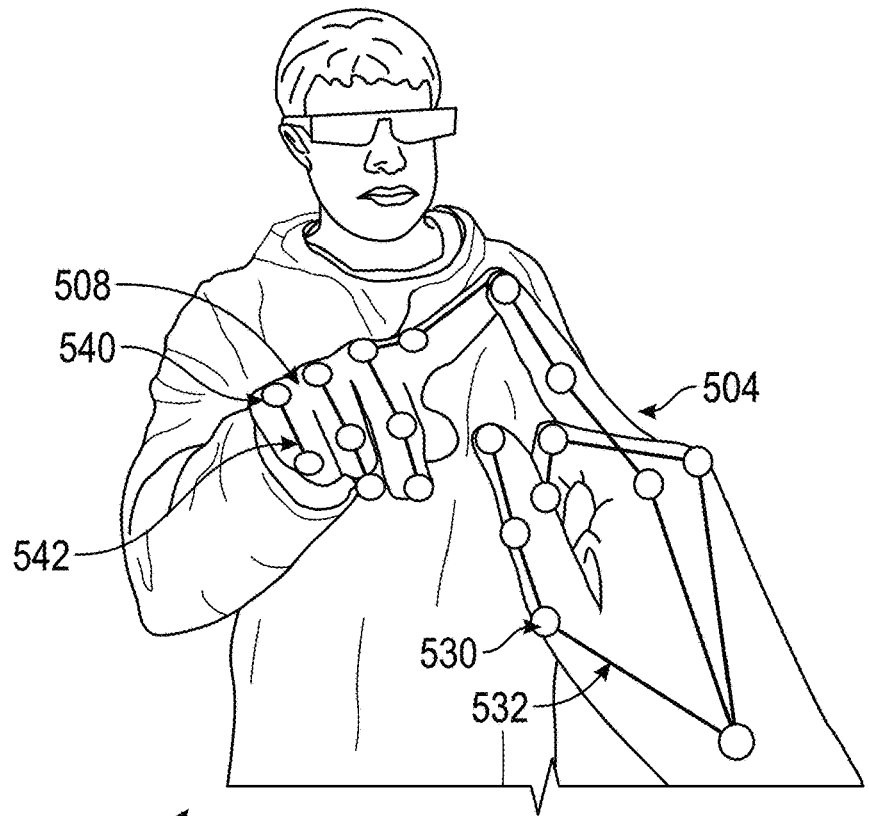

FIG. 5B and FIG. 5C illustrate another example of alignment using somatic points of two users as alignment markers. Initially, user 506 (first user) having a user device 512 (first user device), and user 502 (second user) having a respective user device (second user device, not shown), are positioned proximate each other in a physical area 500. For the alignment gesture, the users touch fingers of their hands, (hand 504 of user 502 and hand 508 of user 506), within an area 510. The gesture is used to determine a spatial relationship of the user devices. The alignment method uses the combination of the hand 508 of user 506 and the hand 504 of user 502, as somatic points for use as alignment markers. The camera of each user device takes an image of the hands with fingers touching in this position or gesture. The user devices use object detection to identify somatic points on the hands in this gesture or configuration as described herein. While both hands are used for somatic points, each user device captures an image from its respective perspective. The user devices determine the position information of the configuration of the hands in different coordinate systems. For consistent user experiences, and as described hereinabove, one of the individual coordinate systems is used as a common reference coordinate system and the other individual coordinate system is aligned thereto.

In some examples, alignment markers are determined by somatic points captured from images of the users' hands in multiple poses. Each user device captures images of each pose using object recognition to identify somatic points, such as joints and connectors, for use as alignment markers. This alignment process does not rely on labeled stationary markers, such as positions on a wall, but may be used in any environment or location as it is based on the pose of one user device in relation to another. In some examples, the camera of a user device is part of a head-wearable apparatus and captures images from the perspective of the pose of the head-wearable apparatus in an individual coordinate system. Communication with of one user device to another may be via a wireless transmission, may be through a network, and so forth.

Multiple user devices may align with respect to a common reference coordinate system in a variety of ways. For N users in an XR session, a first user coordinate system of a first user device is used to determine adjustments to the N−1 other user devices. This may be done individually, between the first or reference user device of the CRCS and each other user device individually, one by one. Alternately, alignment may be done in a daisy chain fashion where each of the N−1 user devices aligns with a previously aligned user device. In this way all user devices are aligned to a CRCS of the first or reference user device.

Continuing with the alignment example, in FIG. 5B, the user devices use object detection methodologies to identify the joints 540 of hand 508 and joints 530 of hand 504 and the joints are used as somatic points to estimate relative positions of the user devices. In some examples, an object detection process may also identify connectors between joints such as connector 542 of hand 508 and connector 532 of hand 504. These connectors are somatic points that may also be used as alignment markers to estimate the relative positions of the user devices. In some examples, other joints and connectors may be identified, such as but not limited to a user's wrist, as additional somatic points, and an alignment process may use one or more of these additional identified somatic points as alignment markers when determining an alignment of user devices to a common reference coordinate system.

Figure 6:
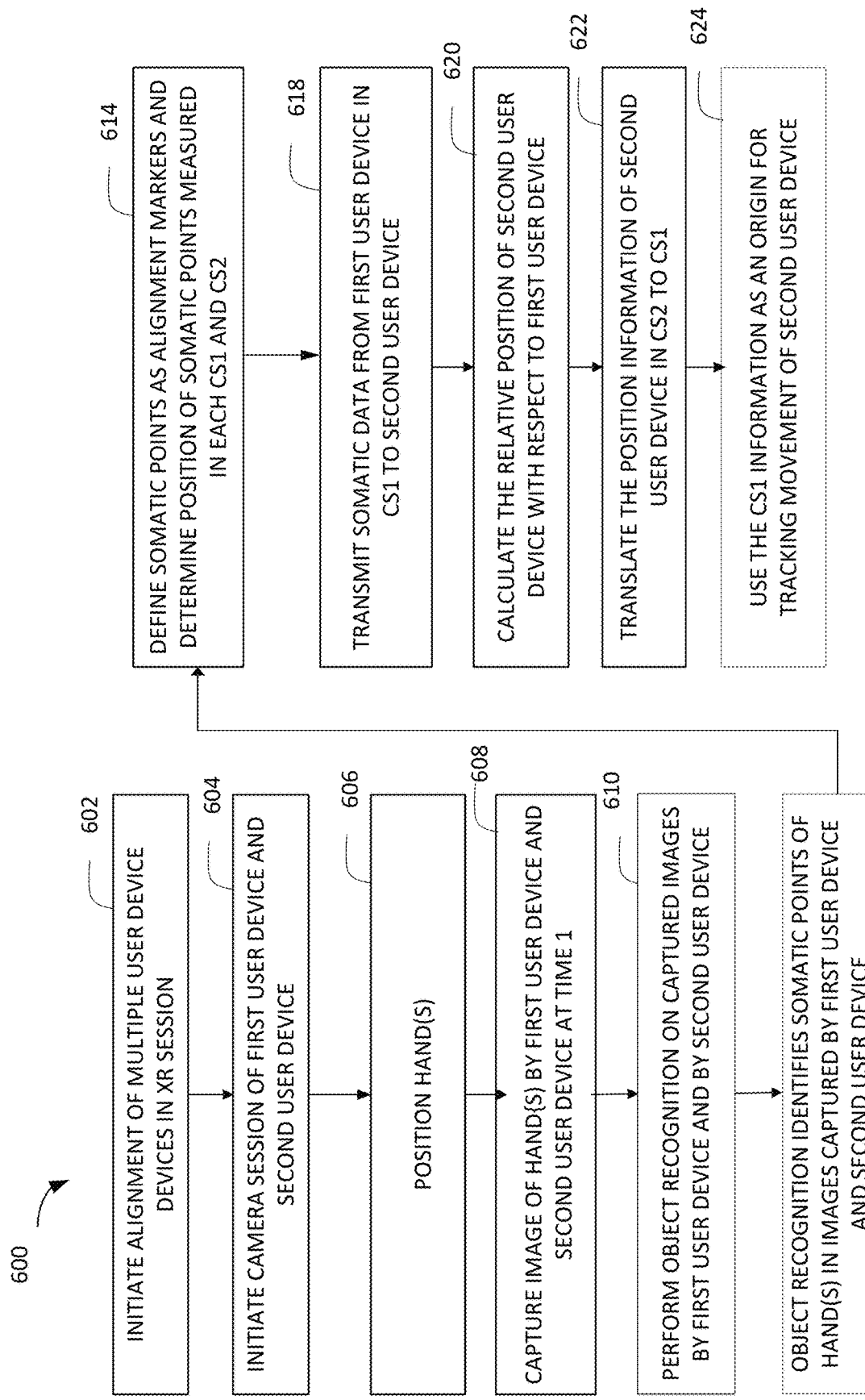
FIG. 6 illustrates a method for alignment of user devices using somatic points, in accordance with some examples.

FIG. 6 illustrates a method for aligning user devices as in FIGS. 5A, 5B and 5C. The process 600 initiates alignment of user devices in an XR session in operation 602. In some examples, the number of user devices is 2, where N=2, including a first user device and a second user device. The first user device and the second user device perform the process 600 to capture somatic points of a hand of a user and use the somatic points as alignment markers. The first user device transmits the somatic points to the second user device, wherein the second user device calculates relative pose information by defining the relationship of coordinate systems of the first user device and the second user device. The relative position is used for translation from one coordinate system to another.

The process 600 aligns user devices to a CRCS. The alignment process 600 uses somatic points on the hands of one or more users, such as a first user and a second user to determine positions and orientation of the first user device and the second user device within an XR environment. Alignment is initiated for an XR session, in operation 602 and the first user device and the second user device initiate camera sessions in operation 604. A first user positions a hand in operation 606 such that the hand is perceivable by the first user device and the second user device. In some examples, a two or more users position their hands in location that is perceivable by all user devices of the XR session. In some examples, the a defined hand position is used to signal to the user devices that they user devices should initiate the alignment process. In some examples, the gesture is a raised hand of one user as in FIGS. 4A, 4B. In some examples, the gesture is two users touching fingers as in FIG. 5B. Once the hand gesture is positioned, the camera of each user device captures an image or images of the hands in the defined gesture, 608, such as fingers touching as identified in FIG. 5B area 510. In some examples, the cameras of the user devices capture the images at a same time. The user devices each perform object recognition in operation 610, to identify somatic points of the hand for alignment from their respective perspectives. Each user device identifies the somatic points, such as joints and/or connectors of user hands, in captured images in operation 612. The somatic points are defined as alignment markers and determines position information of each somatic point in CS1 and CS2 in operation 614. In some examples, the somatic position information may be stored in point-clouds for transmission, analysis and so forth. One of the user devices is used for the CRCS, which in this situation is the first user device of the first user, and therefore the first user device transmits the somatic information in CS1 to the second user device in operation 618. The second user device calculates a relative position with respect to the first user device in operation 620 and translates the somatic position information captured by the second user device to the CRCS in operation 622. Once aligned the second user device uses CS1 for tracking movement and interaction with XR elements and other users in the XR environment in operation 624.

In some examples, the first user device and the second user device communicate to agree one which somatic points to use for alignment, such as by one user device instructing another user device as to which joints to use for somatic points.

In some examples, user devices take images at approximately the same time from different perspectives.

In some examples, a hand being used for alignment is in motion during an image capturing process, where the trajectory may be used in addition to, or in place of, the somatic points.

Figure 7:
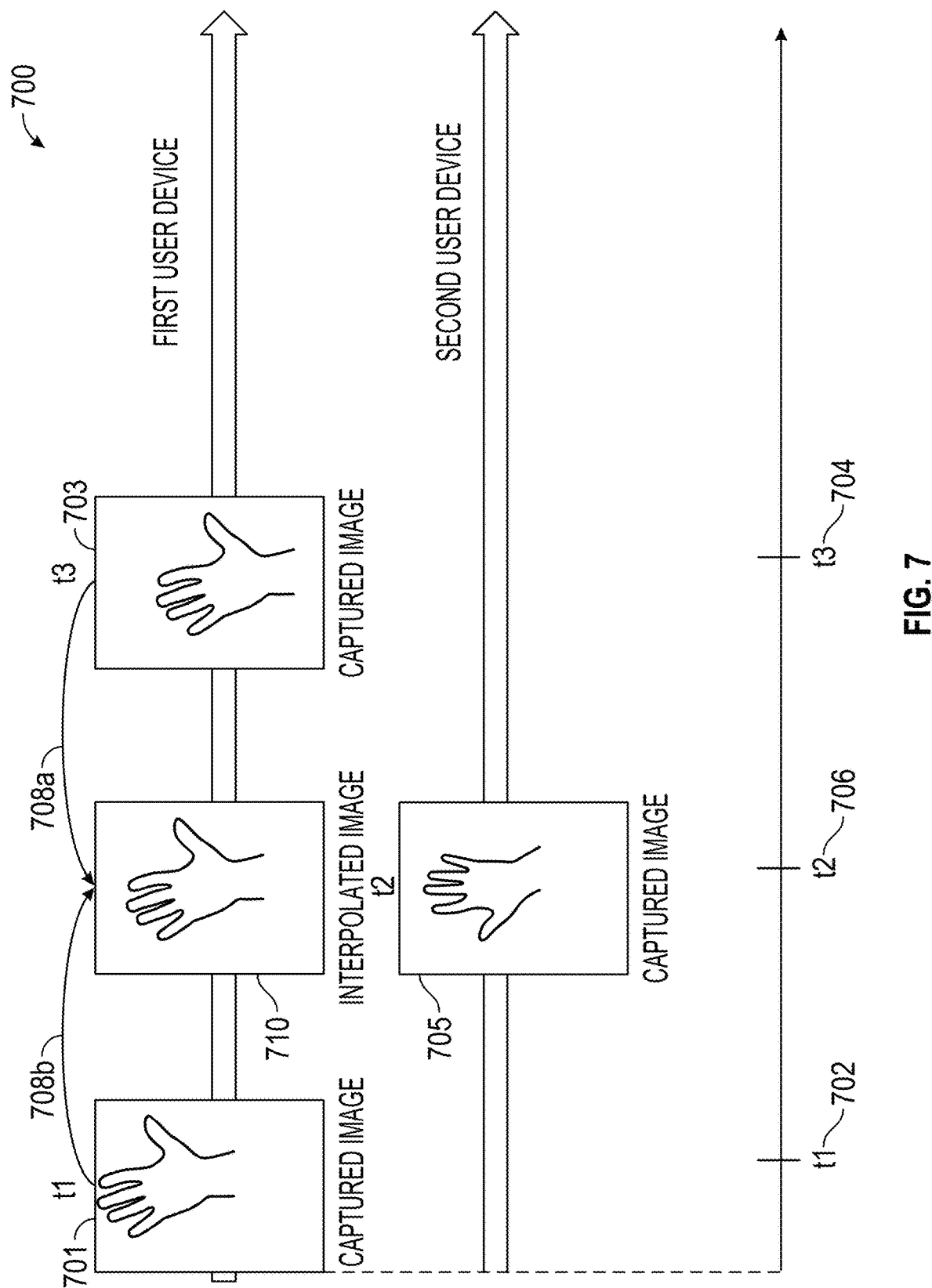
FIG. 7 illustrates synchronization of camera images of multiple user devices by interpolation, in accordance with some examples.

FIG. 7 illustrates a process 700 where images used for somatic point extraction are interpolated, in accordance with some examples. As illustrated in FIG. 7, a user moves a hand being used for alignment from a first point in space to a second point in space and a first user device captures an image 701 of the hand at a first time (t1 702) and captures an image 703 at a second time (t3 704). A second user device captures an image 705 of the hand at a third time (t2 706) between the first time t1 702 and the second time t3 704. The first user device does not capture an image at the third time t2 706. For alignment where the first user device and the second user device capture images at different times, the images may be reconciled by interpolating measured somatic point information from the images captured at different times. To align the user devices to a CRCS, the alignment process is based on images captured from different perspectives when the hand is at a same location, however, interpolation allows for some variance in the time of image capture. In the illustrated example of FIG. 7, the images of the first user device, image 701 and image 703 and the image 705 captured by the second user device are not taken at a same time; and therefore, to align the user devices to a common reference coordinate system, the first user device images are interpolated, as indicated by transitions 708a and 708b, to determine an interpolated image 710 at the third time (t2) when no image was taken by the first user device. The interpolated image 710 of the first user device and the captured image 705 of the second user device are used to identify somatic points used as alignment markers as described herein.

Other examples may use other gestures, multiple gestures, other somatic points, and so forth. In some examples, two hands are used for a gesture to initiate alignment, such as for a user to raise both hands.

In some examples, somatic points may be selected for a given application to provide accurate alignment, and other features may be used, such as the distance between two hands as an alignment marker.

In some examples, a hand boundary or outline and other use hand segmentation are incorporated for somatic alignment markers to provide additional somatic points. These methods alone or in combination with somatic points of the hand may enable pose estimation with more data. In some examples, when creating a point cloud of data, increasing a number of somatic information used for alignment markers improves accuracy while allowing alignment of a denser point cloud to recreate the articulated shape.

System with Head-Wearable Apparatus

Figure 8:
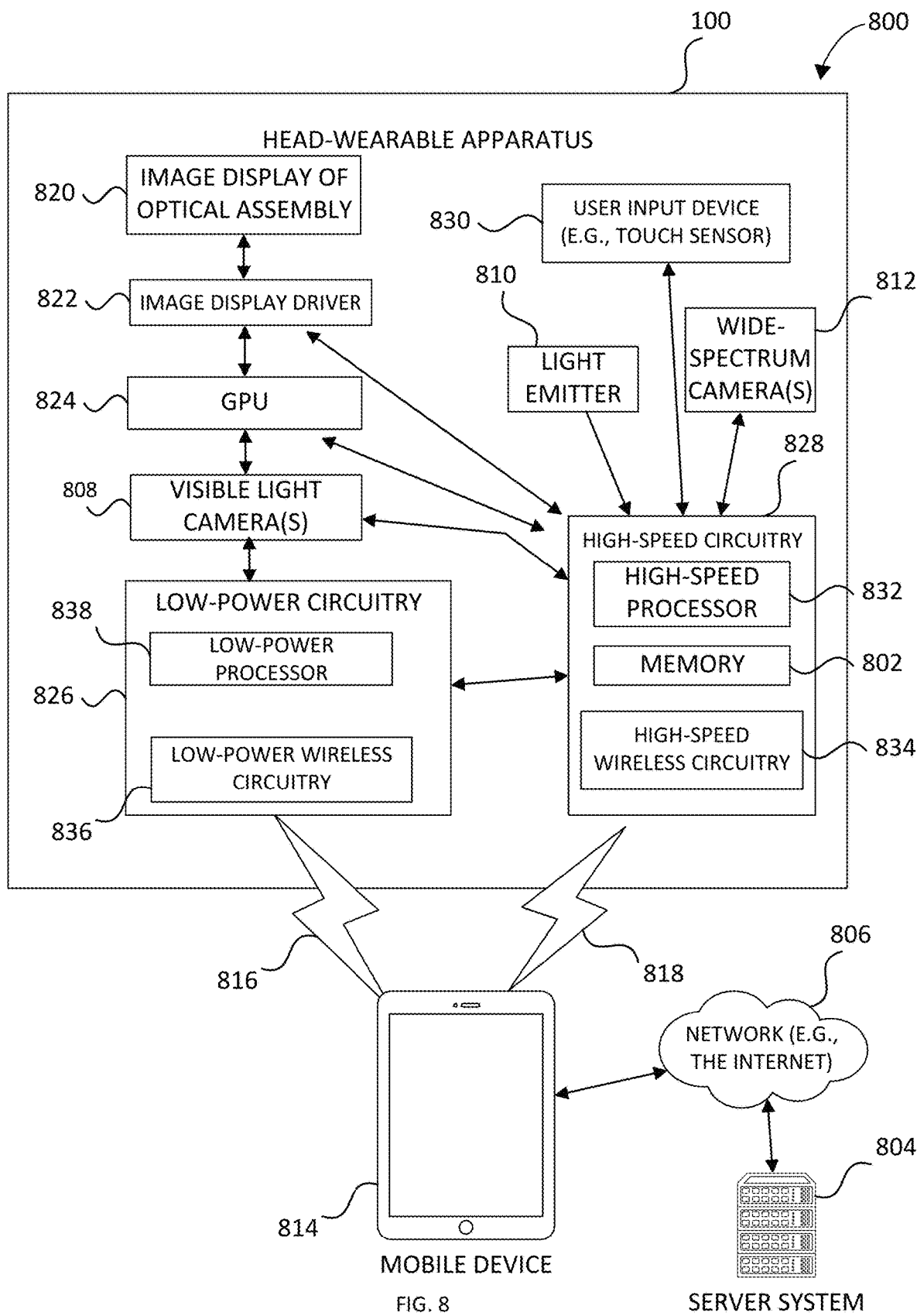
FIG. 8 illustrates a system of a user device, such as a head-wearable apparatus, in accordance with some examples.

FIG. 8 illustrates a system 800 including a head-wearable apparatus 100 with a selector input device, according to some examples. FIG. 8 is a high-level functional block diagram of an example head-wearable apparatus 100 communicatively coupled to a mobile device 814 and various server systems 804 (e.g., the interaction server system 910 of FIG. 9) via various networks 908.

The head-wearable apparatus 100 includes one or more cameras, each of which may be, for example, one or more camera 808, a light emitter 810, and one or more wide-spectrum cameras 812.

The mobile device 814 connects with head-wearable apparatus 100 using both a low-power wireless connection 816 of low-power circuitry 826 and a high-speed wireless connection 818. The mobile device 814 is also connected to the server system 804 and the network 806.

The head-wearable apparatus 100 further includes two image displays of the image display of optical assembly 820. The two image displays of optical assembly 820 include one associated with the left lateral side and one associated with the right lateral side of the head-wearable apparatus 100. The head-wearable apparatus 100 also includes an image display driver 822, and a GPU 824. The image display of optical assembly 820, image display driver 822, and GPU 824 constitute an optical engine of the head-wearable apparatus 100. The image display of optical assembly 820 is for presenting images and videos, including an image that can include a graphical user interface to a user device of the head-wearable apparatus 100.

The image display driver 822 commands and controls the image display of optical assembly 820. The image display driver 822 may deliver image data directly to the image display of optical assembly 820 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 100 includes a frame and stems (or temples) extending from a lateral side of the frame. The head-wearable apparatus 100 further includes a user input device 830 (e.g., touch sensor or push button), including an input surface on the head-wearable apparatus 100. The user input device 830 (e.g., touch sensor or push button) is to receive from the user an input selection to manipulate the graphical user interface of the presented image.

The components shown in FIG. 8 for the head-wearable apparatus 100 are located on one or more circuit boards, for example a PCB or flexible PCB, in the rims or temples. Alternatively, or additionally, the depicted components can be located in the chunks, frames, hinges, or bridge of the head-wearable apparatus 100. Left and right cameras 808 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 100 includes a memory 802, which stores instructions to perform a subset or all of the functions described herein. The memory 802 can also include storage device.

As shown in FIG. 8, the high-speed circuitry 828 includes a high-speed processor 832, a memory 802, and high-speed wireless circuitry 834. In some examples, the image display driver 822 is coupled to the high-speed circuitry 828 and operated by the high-speed processor 832 in order to drive the left and right image displays of the image display of optical assembly 820. The high-speed processor 832 may be any processor capable of managing high-speed communications and operation of any general computing system needed for the head-wearable apparatus 100. The high-speed processor 832 includes processing resources needed for managing high-speed data transfers on a high-speed wireless connection 818 to a wireless local area network (WLAN) using the high-speed wireless circuitry 834. In certain examples, the high-speed processor 832 executes an operating system such as a LINUX operating system or other such operating system of the head-wearable apparatus 100, and the operating system is stored in the memory 802 for execution. In addition to any other responsibilities, the high-speed processor 832 executing a software architecture for the head-wearable apparatus 100 is used to manage data transfers with high-speed wireless circuitry 834. In certain examples, the high-speed wireless circuitry 834 is configured to implement Institute of Electrical and Electronic Engineers (IEEE) 802.11 communication standards, also referred to herein as WiFi. In some examples, other high-speed communications standards may be implemented by the high-speed wireless circuitry 834.

The low-power wireless circuitry 836 and the high-speed wireless circuitry 834 of the head-wearable apparatus 100 can include short-range transceivers (Bluetooth™) and wireless wide, local, or wide area network transceivers (e.g., cellular or WiFi). Mobile device 814, including the transceivers communicating via the low-power wireless connection 816 and the high-speed wireless connection 818, may be implemented using details of the architecture of the head-wearable apparatus 100, as can other elements of the network 806.

The memory 802 includes any storage device capable of storing various data and applications, including, among other things, camera data generated by the left and right cameras 808, the wide-spectrum cameras 812, and the GPU 824, as well as images generated for display by the image display driver 822 on the image displays of the image display of optical assembly 820. While the memory 802 is shown as integrated with high-speed circuitry 828, in some examples, the memory 802 may be an independent standalone element of the head-wearable apparatus 100. In certain such examples, electrical routing lines may provide a connection through a chip that includes the high-speed processor 832 from the GPU 824 or the low-power processor 838 to the memory 802. In some examples, the high-speed processor 832 may manage addressing of the memory 802 such that the low-power processor 838 will boot the high-speed processor 832 any time that a read or write operation involving memory 802 is needed.

As shown in FIG. 8, the low-power processor 838 or high-speed processor 832 of the head-wearable apparatus 100 can be coupled to the camera (camera 808, light emitter 810, or wide-spectrum cameras 812), the image display driver 822, the user input device 830 (e.g., touch sensor or push button), and the memory 802.

The head-wearable apparatus 100 is connected to a host computer. For example, the head-wearable apparatus 100 is paired with the mobile device 814 via the high-speed wireless connection 818 or connected to the server system 804 via the network 806. The server system 804 may be one or more computing devices as part of a service or network computing system, for example, that includes a processor, a memory, and network communication interface to communicate over the network 806 with the mobile device 814 and the head-wearable apparatus 100.

The mobile device 814 includes a processor and a network communication interface coupled to the processor. The network communication interface allows for communication over the network 806, low-power wireless connection 816, or high-speed wireless connection 818. Mobile device 814 can further store at least portions of the instructions for generating binaural audio content in the mobile device 814's memory to implement the functionality described herein.

Output components of the head-wearable apparatus 100 include visual components, such as a display such as a liquid crystal display (LCD), a plasma display panel (PDP), a light-emitting diode (LED) display, a projector, or a waveguide. The image displays of the optical assembly are driven by the image display driver 822. The output components of the head-wearable apparatus 100 further include acoustic components (e.g., speakers), haptic components (e.g., a vibratory motor), other signal generators, and so forth. The input components of the head-wearable apparatus 100, the mobile device 814, and server system 804, such as the user input device 830, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 100 may also include additional peripheral device elements. Such peripheral device elements may include biometric sensors, additional sensors, or display elements integrated with the head-wearable apparatus 100. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 816 and high-speed wireless connection 818 from the mobile device 814 via the low-power wireless circuitry 836 or high-speed wireless circuitry 834.

Networked Computing Environment

FIG. 9 is a block diagram showing an example interaction system 900 for facilitating interactions (e.g., exchanging text messages, conducting text audio and video calls, or playing games) over a network. The interaction system 900 includes multiple computing systems 902, each of which hosts multiple applications, including an interaction client 904 and other applications 906. Each interaction client 904 is communicatively coupled, via one or more communication networks including a network 908 (e.g., the Internet), to other instances of the interaction client 904 (e.g., hosted on respective other computing systems 902), an interaction server system 910 and third-party servers 912). An interaction client 904 can also communicate with locally hosted applications 906 using Applications Program Interfaces (APIs).

Each computing system 902 may comprise one or more user devices, such as a mobile device 814 of FIG. 8, head-wearable apparatus 100 of FIG. 1A, and a computer client device 914 that are communicatively connected to exchange data and messages.

An interaction client 904 interacts with other interaction clients 904 and with the interaction server system 910 via the network 908. The data exchanged between the interaction clients 904 (e.g., interactions 916) and between the interaction clients 904 and the interaction server system 910 includes functions (e.g., commands to invoke functions) and payload data (e.g., text, audio, video, or other multimedia data).

The interaction server system 910 provides server-side functionality via the network 908 to the interaction clients 904. While certain functions of the interaction system 900 are described herein as being performed by either an interaction client 904 or by the interaction server system 910, the location of certain functionality either within the interaction client 904 or the interaction server system 910 may be a design choice. For example, it may be technically preferable to initially deploy particular technology and functionality within the interaction server system 910 but to later migrate this technology and functionality to the interaction client 904 where a computing system 902 has sufficient processing capacity.

The interaction server system 910 supports various services and operations that are provided to the interaction clients 904. Such operations include transmitting data to, receiving data from, and processing data generated by the interaction clients 904. This data may include message content, client device information, geolocation information, media augmentation and overlays, message content persistence conditions, social network information, and live event information. Data exchanges within the interaction system 900 are invoked and controlled through functions available via user interfaces (UIs) of the interaction clients 904.

Turning now specifically to the interaction server system 910, an Application Program Interface (API) server 918 is coupled to and provides programmatic interfaces to Interaction servers 920, making the functions of the Interaction servers 920 accessible to interaction clients 904, other applications 906 and third-party server 912. The Interaction servers 920 are communicatively coupled to a database server 922, facilitating access to a database 924 that stores data associated with interactions processed by the Interaction servers 920. Similarly, a web server 926 is coupled to the Interaction servers 920 and provides web-based interfaces to the Interaction servers 920. To this end, the web server 926 processes incoming network requests over the Hypertext Transfer Protocol (HTTP) and several other related protocols.

The Application Program Interface (API) server 918 receives and transmits interaction data (e.g., commands and message payloads) between the Interaction servers 920 and the XR systems 902 (and, for example, interaction clients 904 and other application 906) and the third-party server 912. Specifically, the Application Program Interface (API) server 918 provides a set of interfaces (e.g., routines and protocols) that can be called or queried by the interaction client 904 and other applications 906 to invoke functionality of the Interaction servers 920. The Application Program Interface (API) server 918 exposes various functions supported by the Interaction servers 920, including account registration; login functionality; the sending of interaction data, via the Interaction servers 920, from a particular interaction client 904 to another interaction client 904; the communication of media files (e.g., images or video) from an interaction client 904 to the Interaction servers 920; the settings of a collection of media data (e.g., a story); the retrieval of a list of friends of a user of a computing system 902; the retrieval of messages and content; the addition and deletion of entities (e.g., friends) to an entity graph (e.g., a social graph); the location of friends within a social graph; and opening an application event (e.g., relating to the interaction client 904). The interaction servers 920 host multiple systems and subsystems.

Linked Applications

Returning to the interaction client 904, features and functions of an external resource (e.g., a linked application or applet) are made available to a user via an interface of the interaction client 904. In this context, "external" refers to the fact that the application 906 or applet is external to the interaction client 904. The external resource is often provided by a third party but may also be provided by the creator or provider of the interaction client 904. The interaction client 904 receives a user selection of an option to launch or access features of such an external resource. The external resource may be the application 906 installed on the computing system 902 (e.g., a "native app"), or a small-scale version of the application (e.g., an "applet") that is hosted on the computing system 902 or remote of the computing system 902 (e.g., on third-party servers 912). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 904. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 904 determines whether the selected external resource is a web-based external resource or a locally-installed application 906. In some cases, applications 906 that are locally installed on the computing system 902 can be launched independently of and separately from the interaction client 904, such as by selecting an icon corresponding to the application 906 on a home screen of the computing system 902. Small-scale versions of such applications can be launched or accessed via the interaction client 904 and, in some examples, no or limited portions of the small-scale application can be accessed outside of the interaction client 904. The small-scale application can be launched by the interaction client 904 receiving, from a third-party server 912 for example, a markup-language document associated with the small-scale application and processing such a document.

In response to determining that the external resource is a locally-installed application 906, the interaction client 904 instructs the computing system 902 to launch the external resource by executing locally-stored code corresponding to the external resource. In response to determining that the external resource is a web-based resource, the interaction client 904 communicates with the third-party servers 912 (for example) to obtain a markup-language document corresponding to the selected external resource. The interaction client 904 then processes the obtained markup-language document to present the web-based external resource within a user interface of the interaction client 904.

The interaction client 904 can notify a user of the computing system 902, or other users related to such a user (e.g., "friends"), of activity taking place in one or more external resources. For example, the interaction client 904 can provide participants in a conversation (e.g., a chat session) in the interaction client 904 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective interaction clients 904, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 904. The external resource can selectively include different media items in the responses, based on a current context of the external resource.

The interaction client 904 can present a list of the available external resources (e.g., applications 906 or applets) to a user to launch or access a given external resource. This list can be presented in a context-sensitive menu. For example, the icons representing different ones of the application 906 (or applets) can vary based on how the menu is launched by the user (e.g., from a conversation interface or from a non-conversation interface).

Data Architecture

Figure 10:
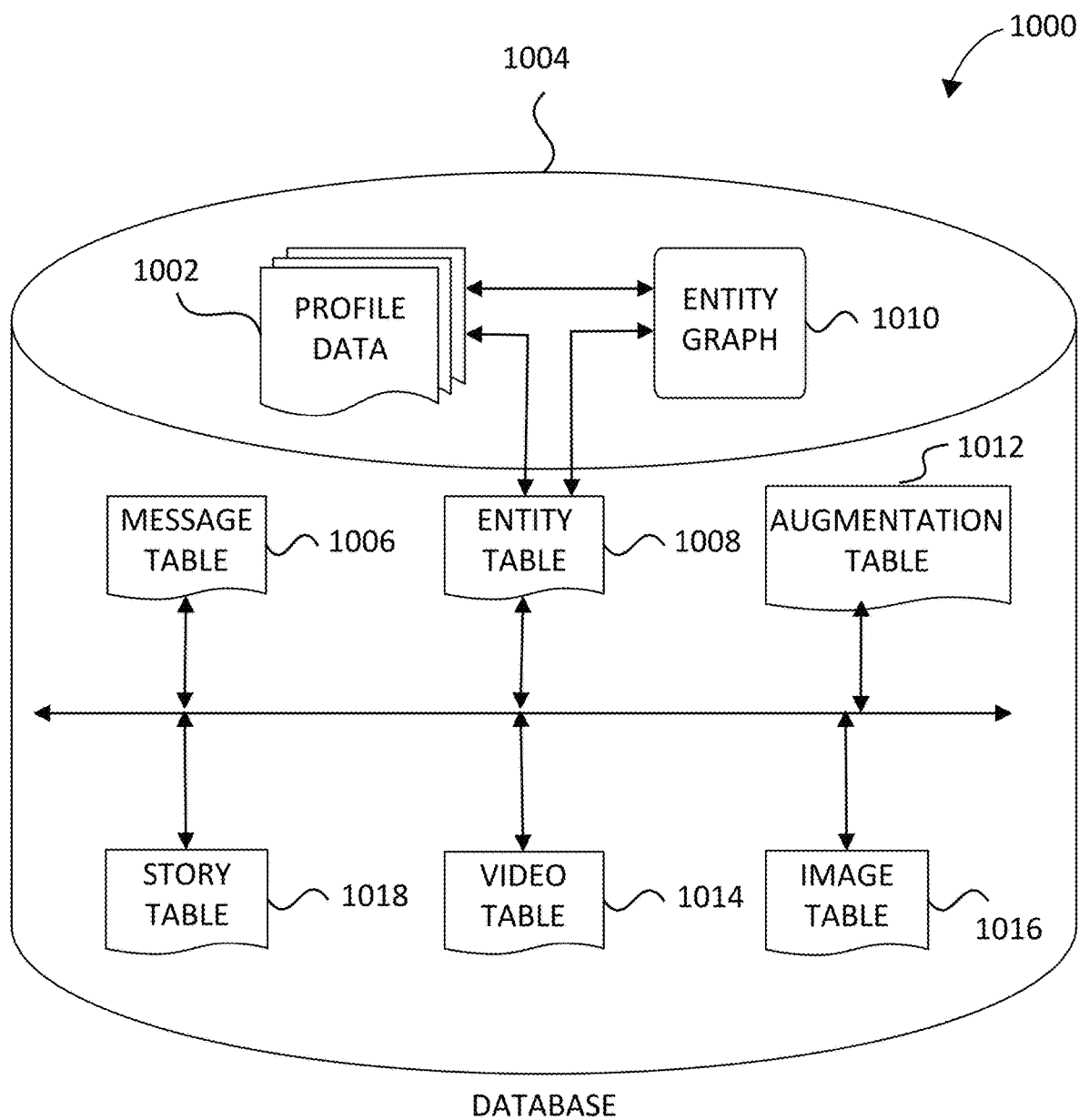
FIG. 10 is a diagrammatic representation of a data structure as maintained in a database, in accordance with some examples.

FIG. 10 is a schematic diagram illustrating data structures 1000, which may be stored in the database 1004 of the interaction server system 910 of FIG. 9, according to certain examples. While the content of the database 1004 is shown to comprise multiple tables, it will be appreciated that the data could be stored in other types of data structures (e.g., as an object-oriented database).

The database 1004 includes message data stored within a message table 1006. This message data includes, for any particular message, at least message sender data, message recipient (or receiver) data, and a payload. Further details regarding information that may be included in a message, and included within the message data stored in the message table 1006, are described below with reference to FIG. 10.

An entity table 1008 stores entity data, and is linked (e.g., referentially) to an entity graph 1010 and profile data 1002.

Entities for which records are maintained within the entity table 1008 may include individuals, corporate entities, organizations, objects, places, events, and so forth. Regardless of entity type, any entity regarding which the interaction server system 910 stores data may be a recognized entity. Each entity is provided with a unique identifier, as well as an entity type identifier (not shown).

The entity graph 1010 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 900 of FIG. 9.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 1008. Such privacy settings may be applied to all types of relationships within the context of the interaction system 900, or may selectively be applied to only certain types of relationships.

The profile data 1002 stores multiple types of profile data about a particular entity. The profile data 1002 may be selectively used and presented to other users of the interaction system 900 based on privacy settings specified by a particular entity. Where the entity is an individual, the profile data 1002 includes, for example, a username, telephone number, address, settings (e.g., notification and privacy settings), as well as a user-selected avatar representation (or collection of such avatar representations). A particular user may then selectively include one or more of these avatar representations within the content of messages communicated via the interaction system 900, and on map interfaces displayed by interaction clients 904 to other users. The collection of avatar representations may include "status avatars," which present a graphical representation of a status or activity that the user may select to communicate at a particular time.

Where the entity is a group, the profile data 1002 for the group may similarly include one or more avatar representations associated with the group, in addition to the group name, members, and various settings (e.g., notifications) for the relevant group.

The database 1004 also stores augmentation data, such as overlays or filters, in an augmentation table 1012. The augmentation data is associated with and applied to videos (for which data is stored in a video table 1014) and images (for which data is stored in an image table 1016).

Filters, in some examples, are overlays that are displayed as overlaid on an image or video during presentation to a message receiver. Filters may be of various types, including user-selected filters from a set of filters presented to a message sender by the interaction client 904 when the message sender is composing a message. Other types of filters include geolocation filters (also known as geo-filters), which may be presented to a message sender based on geographic location. For example, geolocation filters specific to a neighborhood or special location may be presented within a user interface by the interaction client 904, based on geolocation information determined by a Global Positioning System (GPS) unit of the computing system 902.

Another type of filter is a data filter, which may be selectively presented to a message sender by the interaction client 904 as in FIG. 9 based on other inputs or information gathered by the computing system 902 during the message creation process. Examples of data filters include current temperature at a specific location, a current speed at which a message sender is traveling, battery life for a computing system 902, or the current time.

Other augmentation data that may be stored within the image table 1016 includes XR content items (e.g., corresponding to applying Lenses or XR experiences). An XR content item may be a real-time special effect and sound that may be added to an image or a video.

As described above, augmentation data includes XR, VR, and mixed reality (MR) content items, overlays, image transformations, images, and modifications that may be applied to image data (e.g., videos or images). This includes real-time modifications, which modify an image as it is captured using device sensors (e.g., one or multiple cameras) of the computing system 902 and then displayed on a screen of the computing system 902 with the modifications. This also includes modifications to stored content, such as video clips in a collection or group that may be modified. For example, in a computing system 902 with access to multiple XR content items, a user can use a single video clip with multiple XR content items to see how the different XR content items will modify the stored clip. Similarly, real-time video capture may use modifications to show how video images currently being captured by sensors of a computing system 902 would modify the captured data. Such data may simply be displayed on the screen and not stored in memory, or the content captured by the device sensors may be recorded and stored in memory with or without the modifications (or both). In some systems, a preview feature can show how different XR content items will look within different windows in a display at the same time. This can, for example, enable multiple windows with different pseudorandom animations to be viewed on a display at the same time.

Data and various systems using XR content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In some examples, tracking of points on an object may be used to place an image or texture (which may be two-dimensional or three-dimensional) at the tracked position. In still further examples, neural network analysis of video frames may be used to place images, models, or textures in content (e.g., images or frames of video). XR content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of an object are calculated (e.g., using an Active Shape Model (ASM) or other known methods). Then, a mesh based on the characteristic points is generated for each element of the object. This mesh is used in the following stage of tracking the elements of the object in the video stream. In the process of tracking, the mesh for each element is aligned with a position of each element. Then, additional points are generated on the mesh.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing the color of areas; removing some part of areas from the frames of the video stream; including new objects into areas that are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image using a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, visual features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

A transformation system can capture an image or video stream on a client device (e.g., the computing system 902) and perform complex image manipulations locally on the computing system 902 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the computing system 902.

In some examples, a computer animation model to transform image data can be used by a system where a user may capture an image or video stream of the user (e.g., a selfie) using the computing system 902 having a neural network operating as part of an interaction client 904 operating on the computing system 902. The transformation system operating within the interaction client 904 determines the presence of a face within the image or video stream and provides modification icons associated with a computer animation model to transform image data, or the computer animation model can be present as associated with an interface described herein. The modification icons include changes that are the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the computing system 902 as soon as the image or video stream is captured and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browsing to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 1018 stores data regarding collections of messages and associated image, video, or audio data, which are compiled into a collection (e.g., a story or a gallery). The creation of a particular collection may be initiated by a particular user (e.g., each user for which a record is maintained in the entity table 1008). A user may create a "personal story" in the form of a collection of content that has been created and sent/broadcast by that user. To this end, the user interface of the interaction client 904 may include an icon that is user-selectable to enable a message sender to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 904, to contribute content to a particular live story. The live story may be identified to the user by the interaction client 904, based on his or her location. The end result is a "live story" told from a community perspective.

A further type of content collection is known as a "location story," which enables a user whose computing system 902 is located within a specific geographic location (e.g., on a college or university campus) to contribute to a particular collection. In some examples, a contribution to a location story may require a second degree of authentication to verify that the end-user belongs to a specific organization or other entity (e.g., is a student on the university campus).

As mentioned above, the video table 1014 stores video data that, in some examples, is associated with messages for which records are maintained within the message table 1006. Similarly, the image table 1016 stores image data associated with messages for which message data is stored in the entity table 1008. The entity table 1008 may associate various augmentations from the augmentation table 1012 with various images and videos stored in the image table 1016 and the video table 1014. The databases 1004 also include social network information collected by a social network system.

System Architecture

Figure 11:
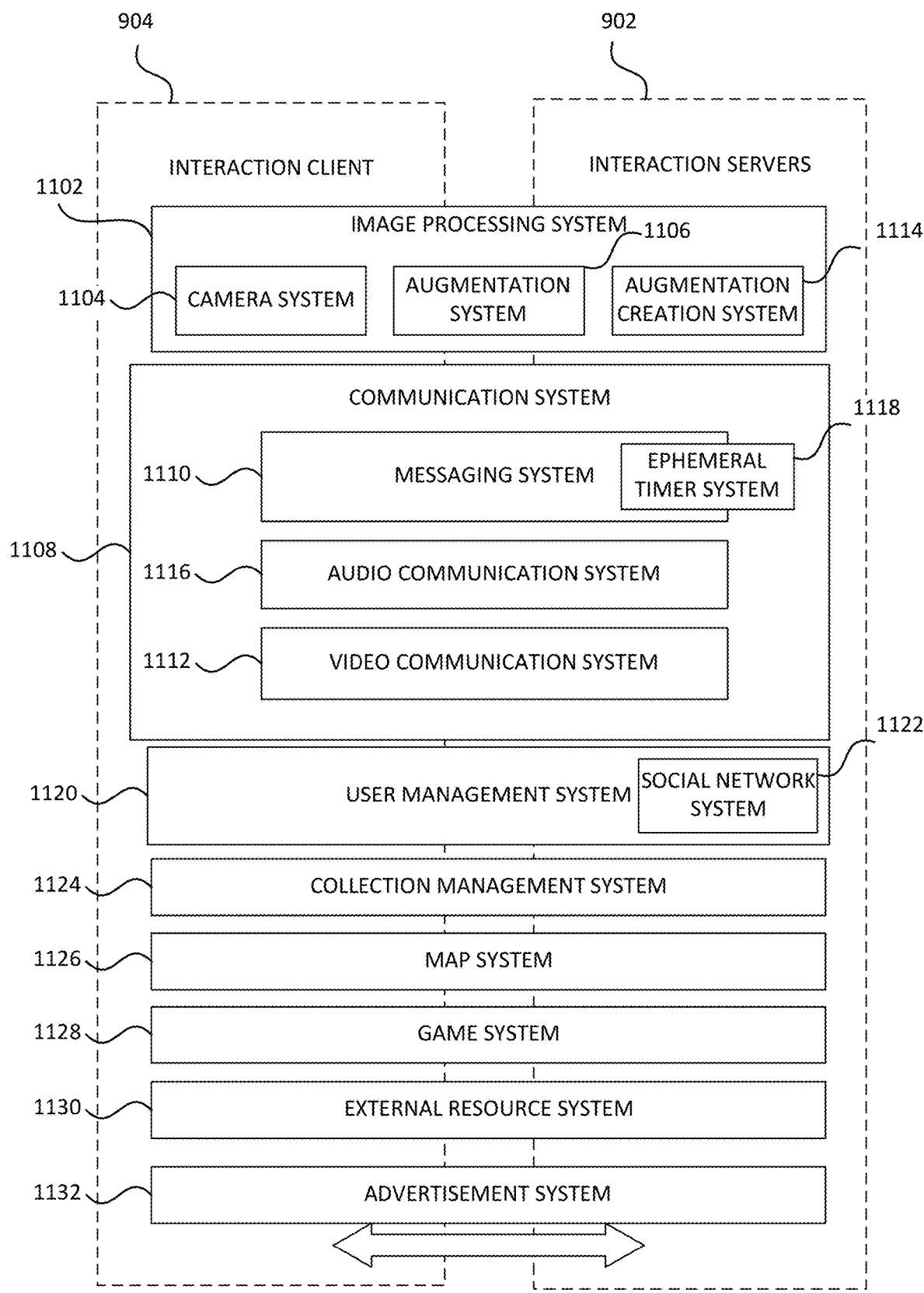
FIG. 11 is a diagrammatic representation of a messaging system that has both client-side and server-side functionality, in accordance with some examples.

FIG. 11 is a block diagram illustrating further details regarding the interaction system 900, according to some examples. Specifically, the interaction system 900 is shown to comprise the interaction client 904 and the interaction servers 920. The interaction system 900 embodies multiple subsystems, which are supported on the client-side by the interaction client 904 and on the server-side by the Interaction servers 920. Example subsystems are discussed below.

An image processing system 1102 provides various functions that enable a user to capture and augment (e.g., augment or otherwise modify or edit) media content associated with a message.

A camera system 1104 includes control software (e.g., in a camera application) that interacts with and controls hardware camera hardware (e.g., directly or via operating system controls) of the computing system 902 to modify and augment real-time images captured and displayed via the interaction client 904.

The augmentation system 1106 provides functions related to the generation and publishing of augmentations (e.g., media overlays) for images captured in real-time by cameras of the computing system 902 or retrieved from memory of the computing system 902. For example, the augmentation system 1106 operatively selects, presents, and displays media overlays (e.g., an image filter or an image lens) to the interaction client 904 for the augmentation of real-time images received via the camera system 1104 or stored images retrieved from memory 802 of a computing system 902. These augmentations are selected by the augmentation system 1106 and presented to a user of an interaction client 904, based on a number of inputs and data, such as for example:

Geolocation of the computing system 902; and
Social network information of the user of the computing system 902.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at computing system 902 for communication in a message, or applied to video content, such as a video content stream or feed transmitted from an interaction client 904. As such, the image processing system 1102 may interact with, and support, the various subsystems of the communication system 1108, such as the messaging system 1110 and the video communication system 1112.

A media overlay may include text or image data that can be overlaid on top of a photograph taken by the computing system 902 or a video stream produced by the computing system 902. In some examples, the media overlay may be a location overlay (e.g., Venice beach), a name of a live event, or a name of a merchant overlay (e.g., Beach Coffee House). In further examples, the image processing system 1102 uses the geolocation of the computing system 902 to identify a media overlay that includes the name of a merchant at the geolocation of the computing system 902. The media overlay may include other indicia associated with the merchant. The media overlays may be stored in the databases 924 and accessed through the database server 922.

The image processing system 1102 provides a user-based publication platform that enables users to select a geolocation on a map and upload content associated with the selected geolocation. The user may also specify circumstances under which a particular media overlay should be offered to other users. The image processing system 1102 generates a media overlay that includes the uploaded content and associates the uploaded content with the selected geolocation.

The augmentation creation system 1114 supports XR developer platforms and includes an application for content creators (e.g., artists and developers) to create and publish augmentations (e.g., XR experiences) of the interaction client 904. The augmentation creation system 1114 provides a library of built-in features and tools to content creators including, for example custom shaders, tracking technology, and templates.

In some examples, the augmentation creation system 1114 provides a merchant-based publication platform that enables merchants to select a particular augmentation associated with a geolocation via a bidding process. For example, the augmentation creation system 1114 associates a media overlay of the highest bidding merchant with a corresponding geolocation for a predefined amount of time.

A communication system 1108 is responsible for enabling and processing multiple forms of communication and interaction within the interaction system 900 and includes a messaging system 1110, an audio communication system 1116, and a video communication system 1112. The messaging system 1110 is responsible for enforcing the temporary or time-limited access to content by the interaction clients 904. The messaging system 1110 incorporates multiple timers (e.g., within an ephemeral timer system 1118) that, based on duration and display parameters associated with a message or collection of messages (e.g., a story), selectively enable access (e.g., for presentation and display) to messages and associated content via the interaction client 904. Further details regarding the operation of the ephemeral timer system 1118 are provided below. The audio communication system 1116 enables and supports audio communications (e.g., real-time audio chat) between multiple interaction clients 904. Similarly, the video communication system 1112 enables and supports video communications (e.g., real-time video chat) between multiple interaction clients 904.

A user management system 1120 is operationally responsible for the management of user data and profiles, and includes a social network system 1122 that maintains social network information regarding relationships between users of the interaction system 900.

A collection management system 1124 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 1124 may also be responsible for publishing an icon that provides notification of a particular collection to the user interface of the interaction client 904. The collection management system 1124 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 1124 employs machine vision (or image recognition technology) and content rules to curate a content collection automatically. In certain examples, compensation may be paid to a user to include user-generated content into a collection. In such cases, the collection management system 1124 operates to automatically make payments to such users to use their content.

A map system 1126 provides various geographic location functions and supports the presentation of map-based media content and messages by the interaction client 904. For example, the map system 1126 enables the display of user icons or avatars (e.g., stored in profile data 1002) on a map to indicate a current or past location of "friends" of a user, as well as media content (e.g., collections of messages including photographs and videos) generated by such friends, within the context of a map. For example, a message posted by a user to the interaction system 900 from a specific geographic location may be displayed within the context of a map at that particular location to "friends" of a specific user on a map interface of the interaction client 904. A user can furthermore share his or her location and status information (e.g., using an appropriate status avatar) with other users of the interaction system 900 via the interaction client 904, with this location and status information being similarly displayed within the context of a map interface of the interaction client 904 to selected users.

A game system 1128 provides various gaming functions within the context of the interaction client 904. The interaction client 904 provides a game interface providing a list of available games that can be launched by a user within the context of the interaction client 904 and played with other users of the interaction system 900. The interaction system 900 further enables a particular user to invite other users to participate in the play of a specific game by issuing invitations to such other users from the interaction client 904. The interaction client 904 also supports audio, video, and text messaging (e.g., chats) within the context of gameplay, provides a leaderboard for the games, and also supports the provision of in-game rewards (e.g., coins and items).

An external resource system 1130 provides an interface for the interaction client 904 to communicate with remote servers (e.g., third-party servers 912) to launch or access external resources, i.e., applications or applets. Each third-party server 912 hosts, for example, a markup language (e.g., HTML5) based application or a small-scale version of an application (e.g., game, utility, payment, or ride-sharing application). The interaction client 904 may launch a web-based resource (e.g., application) by accessing the HTML5 file from the third-party servers 912 associated with the web-based resource. Applications hosted by third-party servers 912 are programmed in JavaScript leveraging a Software Development Kit (SDK) provided by the Interaction servers 920. The SDK includes Application Programming Interfaces (APIs) with functions that can be called or invoked by the web-based application. The Interaction servers 920 host a JavaScript library that provides a given external resource access to specific user data of the interaction client 904. HTML5 is an example of technology for programming games, but applications and resources programmed based on other technologies can be used.

To integrate the functions of the SDK into the web-based resource, the SDK is downloaded by the third-party server 912 from the Interaction servers 920 or is otherwise received by the third-party server 912. Once downloaded or received, the SDK is included as part of the application code of a web-based external resource. The code of the web-based resource can then call or invoke certain functions of the SDK to integrate features of the interaction client 904 into the web-based resource.

The SDK stored on the interaction server system 910 effectively provides the bridge between an external resource (e.g., applications 906 or applets) and the interaction client 904. This gives the user a seamless experience of communicating with other users on the interaction client 904 while also preserving the look and feel of the interaction client 904. To bridge communications between an external resource and an interaction client 904, the SDK facilitates communication between third-party servers 912 and the interaction client 904. A Web ViewJavaScriptBridge running on a computing system 902 establishes two one-way communication channels between an external resource and the interaction client 904. Messages are sent between the external resource and the interaction client 904 via these communication channels asynchronously. Each SDK function invocation is sent as a message and callback. Each SDK function is implemented by constructing a unique callback identifier and sending a message with that callback identifier.

By using the SDK, not all information from the interaction client 904 is shared with third-party servers 912. The SDK limits which information is shared based on the needs of the external resource. Each third-party server 912 provides an HTML5 file corresponding to the web-based external resource to Interaction servers 920. The Interaction servers 920 can add a visual representation (such as a box art or other graphic) of the web-based external resource in the interaction client 904. Once the user selects the visual representation or instructs the interaction client 904 through a GUI of the interaction client 904 to access features of the web-based external resource, the interaction client 904 obtains the HTML5 file and instantiates the resources to access the features of the web-based external resource.

The interaction client 904 presents a graphical user interface (e.g., a landing page or title screen) for an external resource. During, before, or after presenting the landing page or title screen, the interaction client 904 determines whether the launched external resource has been previously authorized to access user data of the interaction client 904. In response to determining that the launched external resource has been previously authorized to access user data of the interaction client 904, the interaction client 904 presents another graphical user interface of the external resource that includes functions and features of the external resource. In response to determining that the launched external resource has not been previously authorized to access user data of the interaction client 904, after a threshold period of time (e.g., 3 seconds) of displaying the landing page or title screen of the external resource, the interaction client 904 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 904 adds the external resource to a list of authorized external resources and allows the external resource to access user data from the interaction client 904. The external resource is authorized by the interaction client 904 to access the user data under an OAuth 2 framework.

The interaction client 904 controls the type of user data that is shared with external resources based on the type of external resource being authorized. For example, external resources that include full-scale applications (e.g., an application 906) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 1132 operationally enables the purchasing of advertisements by third parties for presentation to end-users via the interaction clients 904 and also handles the delivery and presentation of these advertisements.

Software Architecture

Figure 12:
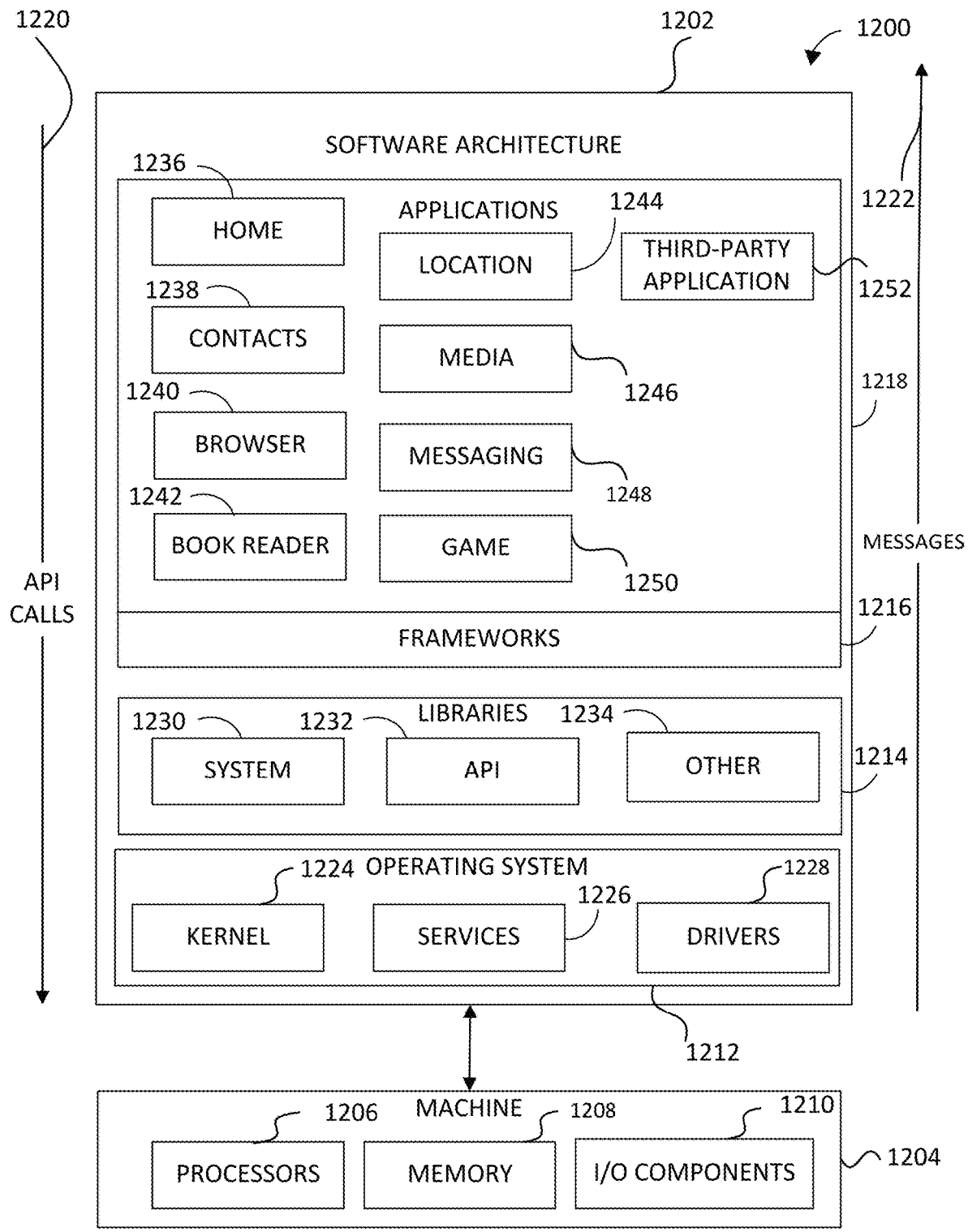
FIG. 12 is a block diagram showing a software architecture, in accordance with some examples.

FIG. 12 is a block diagram 1200 illustrating a software architecture 1202, which can be installed on any one or more of the devices described herein. The software architecture 1202 is supported by hardware such as a machine 1204 that includes processors 1206, memory 1208, and I/O components 1210. In some examples, the software architecture 1202 can be conceptualized as a stack of layers, where each layer provides a particular functionality. The software architecture 1202 includes layers such as an operating system 1212, libraries 1214, frameworks 1216, and applications 1218. Operationally, the applications 1218 invoke API calls 1220 through the software stack and receive messages 1222 in response to the API calls 1220.

The operating system 1212 manages hardware resources and provides common services. The operating system 1212 includes, for example, a kernel 1224, services 1226, and drivers 1228. The kernel 1224 acts as an abstraction layer between the hardware and the other software layers. For example, the kernel 1224 provides memory management, processor management (e.g., scheduling), component management, networking, and security settings, among other functionalities. The services 1226 can provide other common services for the other software layers. The drivers 1228 are responsible for controlling or interfacing with the underlying hardware. For instance, the drivers 1228 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1214 provide a common low-level infrastructure used by the applications 1218. The libraries 1214 can include system libraries 1230 (e.g., C standard library) that provide functions such as memory allocation functions, string manipulation functions, mathematic functions, and the like. In addition, the libraries 1214 can include API libraries 1232 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1214 can also include a wide variety of other libraries 1234 to provide many other APIs to the applications 1218.

The frameworks 1216 provide a common high-level infrastructure that is used by the applications 1218. For example, the frameworks 1216 provide various graphical user interface (GUI) functions, high-level resource management, and high-level location services. The frameworks 1216 can provide a broad spectrum of other APIs that can be used by the applications 1218, some of which may be specific to a particular operating system or platform.

In an example, the applications 1218 may include a home application 1236, a contacts application 1238, a browser application 1240, a book reader application 1242, a location application 1244, a media application 1246, a messaging application 1248, a game application 1250, and a broad assortment of other applications such as a third-party application 1252. The applications 1218 are programs that execute functions defined in the programs. Various programming languages can be employed to create one or more of the applications 1218, structured in a variety of manners, such as object-oriented programming languages (e.g., Objective-C, Java, or C++) or procedural programming languages (e.g., C or assembly language). In a specific example, the third-party application 1252 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In some examples, the third-party application 1252 can invoke the API calls 1220 provided by the operating system 1212 to facilitate functionalities described herein.

CONCLUSION

Changes and modifications may be made to the disclosed examples without departing from the scope of the present disclosure. These and other changes or modifications are intended to be included within the scope of the present disclosure, as expressed in the following claims.

Glossary

"Carrier signal" refers to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In some examples, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE)

standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Machine-readable storage medium" refers to both machine-storage media and transmission media. Thus, the terms include both storage devices/media and carrier waves/modulated data signals. The terms "computer-readable medium," "machine-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory machine-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A method for aligning user devices in an extended Reality (XR) environment, comprising:
    capturing, by a first user device of the user devices, first one or more positions of one or more somatic points of a hand of a user, the first one or more positions of the one or more somatic points in a first coordinate system of the first user device;
    capturing, by a second user device of the user devices, second one or more positions of the one or more somatic points of the hand of the user, the second one or more positions in a second coordinate system of the second user device;
    generating, by the first user device, a reference data set using the first one or more positions of the one or more somatic points in the first coordinate system;
    transmitting, by the first user device, the reference data set to the second user device of the user devices;
    receiving, by the second user device, the reference data set;
    generating, by the second user device, a common reference coordinate system using the reference data set in the first coordinate system and the second one or more positions of the one or more somatic points in the second coordinate system; and
    aligning, by the second user device, the second user device to the first user device by using the common reference coordinate system as the second coordinate system of the second user device.

2. The method for aligning user devices in an XR environment of claim 1, wherein the somatic points comprise joints of the hand.

3. The method for aligning user devices in an XR environment of claim 1, further comprising:
    determining, by the first device, a first position of the first user using a pose tracker component of the first user device.

4. The method for aligning user devices in an XR environment of claim 3, wherein the reference data set includes a 6 degrees of freedom measure from the pose tracker component.

5. The method for aligning user devices in an XR environment of claim 1, further comprising:
    performing, by the first device, object recognition to identify the one or more somatic points.

6. The method for aligning user devices in an XR environment of claim 5, wherein the first user device captures a palm view of the hand and the second user device captures a backhand view of the hand.

7. The method for aligning user devices in an XR environment of claim 1, wherein the first user device and the second user device are head-wearable apparatuses.

8. An extended Reality (XR) system, comprising:
    a first user device comprising:
        first one or more processors; and
        a first memory storing first instructions that, when executed by the first one or more processors, cause the first user device to perform first operations comprising:
            capturing first one or more positions of one or more somatic points of a hand of a user, the first one or more positions of the one or more somatic points in a first coordinate system of the first user device;
            generating a reference data set using the first one or more positions of the one or more somatic points in the first coordinate system; and
            transmitting the reference data set to a second user device of the user devices; and
    the second user device, comprising:
        second one or more processors; and
        a second memory storing second instructions that, when executed by the second one or more processors, cause the second user device to perform second operations comprising:
            capturing second one or more positions of the one or more somatic points of the hand of the user, the second positions in a second coordinate system of the second user device;
            receiving, from the first user device, the reference data set;
            generating a common reference coordinate system using the reference data set in the first coordinate system and the second one or more positions of the one or more somatic points, the second one or more positions in the second coordinate system; and
            aligning the second device to the first user device by using the common reference coordinate system as the second coordinate system of the second user device.

9. The XR system of claim 8, wherein the first user device and the second user device are head-wearable apparatuses.

10. The XR system of claim 8, wherein the somatic points comprise joints of the hand.

11. The XR system of claim 8, the first operations further comprising:
    determining a position of the first user using a pose tracker component of the first user device.

12. The XR system of claim 8, wherein the reference data set includes a 6 degrees of freedom measure from a pose tracker component of the second user device.

13. The XR system of claim 8, the first operations further comprising:
    performing object recognition to identify the somatic points.

14. The XR system of claim 8, wherein the first user device captures a palm view of the hand and the second user device captures a backhand view of the hand.

15. A non-transitory computer-readable storage medium, the computer-readable storage medium including instructions that when executed by a computer, cause the computer to perform operations comprising:
    capturing first one or more positions of one or more somatic points of a hand of a user, the first one or more positions in a first coordinate system of a first user device;
    receiving, from a second user device, a reference data set in a second coordinate system of the second user device, the reference data set generated by the second user device using second one or more positions of the one or more somatic points of the hand of the user, the second one or more positions in the second coordinate system, the second one or more positions captured by the second user device;
    generating a common reference coordinate system using the reference data set in the second coordinate system and the first one or more positions of the one or more somatic points, the first one or more positions in the first coordinate system; and
    aligning the first user device to the second user device by using the common reference coordinate system as the first coordinate system of the first user device.

16. The non-transitory computer-readable storage medium of claim 15, wherein the somatic points comprise joints of the hand.

17. The non-transitory computer-readable storage medium of claim 15, wherein the reference data set includes a 6 degrees of freedom measure from a pose tracker component of the second user device.

18. The non-transitory computer-readable storage medium of claim 15, wherein the first user device and the second user device use object recognition to identify the one or more somatic points.

19. The non-transitory computer-readable storage medium of claim 15, wherein the first user device captures a backhand view of the hand and the second user device captures a palm view of the hand.

20. The non-transitory computer-readable storage medium of claim 15, wherein the first user device and the second user device are head-wearable apparatuses.

* * * * *